(12) United States Patent
Gassner et al.

(10) Patent No.: US 12,306,806 B1
(45) Date of Patent: May 20, 2025

(54) SYSTEMS AND METHODS FOR DATA ACCESS ACCELERATION AND CONTROL WITHIN A SECURE STORAGE NETWORK

(71) Applicant: Veeva Systems Inc., Pleasanton, CA (US)

(72) Inventors: Peter Gassner, Pleasanton, CA (US); Jonathan Stone, Olympia, WA (US); Derek Allwardt, Pleasanton, CA (US); Qing Yang, Pleasanton, CA (US); Vinayak Shenoi, San Ramon, CA (US); Arvind Talari, Dublin, CA (US); David Ding Sun, Cupertino, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/917,688

(22) Filed: Oct. 16, 2024

Related U.S. Application Data

(63) Continuation-in-part of application No. 18/638,574, filed on Apr. 17, 2024.

(51) Int. Cl.
*G06F 16/18* (2019.01)
*G06F 16/174* (2019.01)
*G06F 16/23* (2019.01)

(52) U.S. Cl.
CPC ...... *G06F 16/1858* (2019.01); *G06F 16/1756* (2019.01); *G06F 16/2379* (2019.01)

(58) Field of Classification Search
CPC ............. G06F 16/1858; G06F 16/1756; G06F 16/2379

See application file for complete search history.

(56) References Cited

U.S. PATENT DOCUMENTS

| | | | |
|---|---|---|---|
| 9,262,432 B2 * | 2/2016 | Jayaraman | G06F 16/2365 |
| 10,175,894 B1 * | 1/2019 | Visvanathan | G06F 12/128 |
| 10,311,020 B1 * | 6/2019 | Lazier | G06F 16/1827 |
| 11,762,855 B1 | 9/2023 | Akidau et al. | |
| 2013/0282662 A1 * | 10/2013 | Kumarasamy | G06F 3/0689 |
| | | | 707/649 |
| 2019/0182226 A1 | 6/2019 | Bakthavachalam et al. | |
| 2019/0230181 A1 | 7/2019 | Wang | |
| 2020/0051147 A1 | 2/2020 | Tsai et al. | |
| 2020/0118040 A1 | 4/2020 | Dey et al. | |
| 2022/0353295 A1 | 11/2022 | Yeh et al. | |
| 2023/0237029 A1 * | 7/2023 | Tal | G06F 16/215 |
| | | | 707/692 |

* cited by examiner

*Primary Examiner* — Albert M Phillips, III
*Assistant Examiner* — Fatima P Mina
(74) *Attorney, Agent, or Firm* — Baker & McKenzie LLP

(57) ABSTRACT

The disclosed method includes: communicatively coupling an object database, a first application, and a second application; loading: a first set of data indices into a first primary data store, a second set of data indices into a first secondary data store, a third set of data indices into a first tertiary data store, and the third set of data indices into a second tertiary data store; modifying: at least one first data element comprised in the third set of data indices, and at least one second data element; initiating a data deduplication computing operation by selectively marking data elements within the first secondary data store that map to the one of the first modified data element and the second modified data element; and merging the one of the first modified data element and the second modified data element with data elements comprised in the first secondary data store.

17 Claims, 24 Drawing Sheets

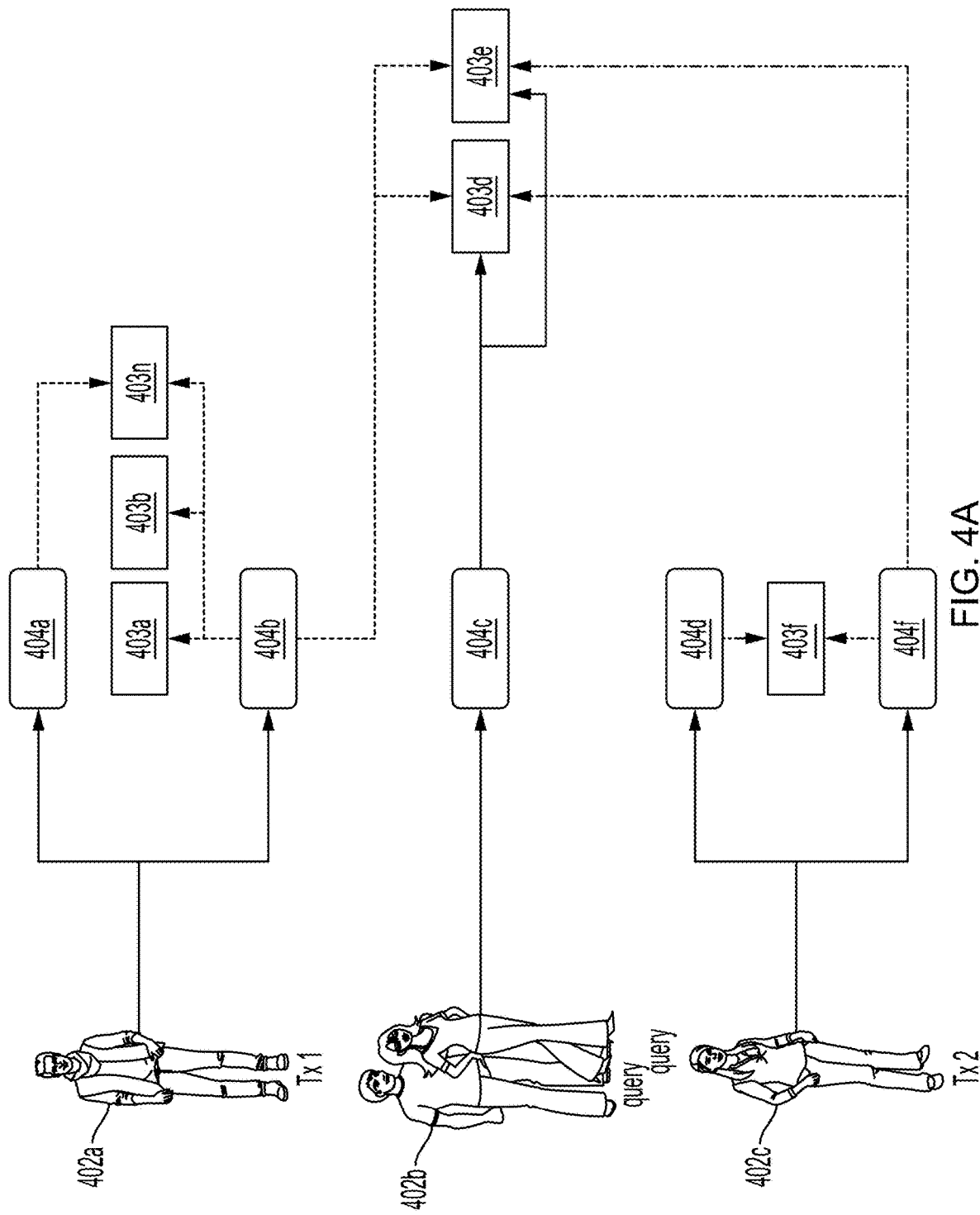

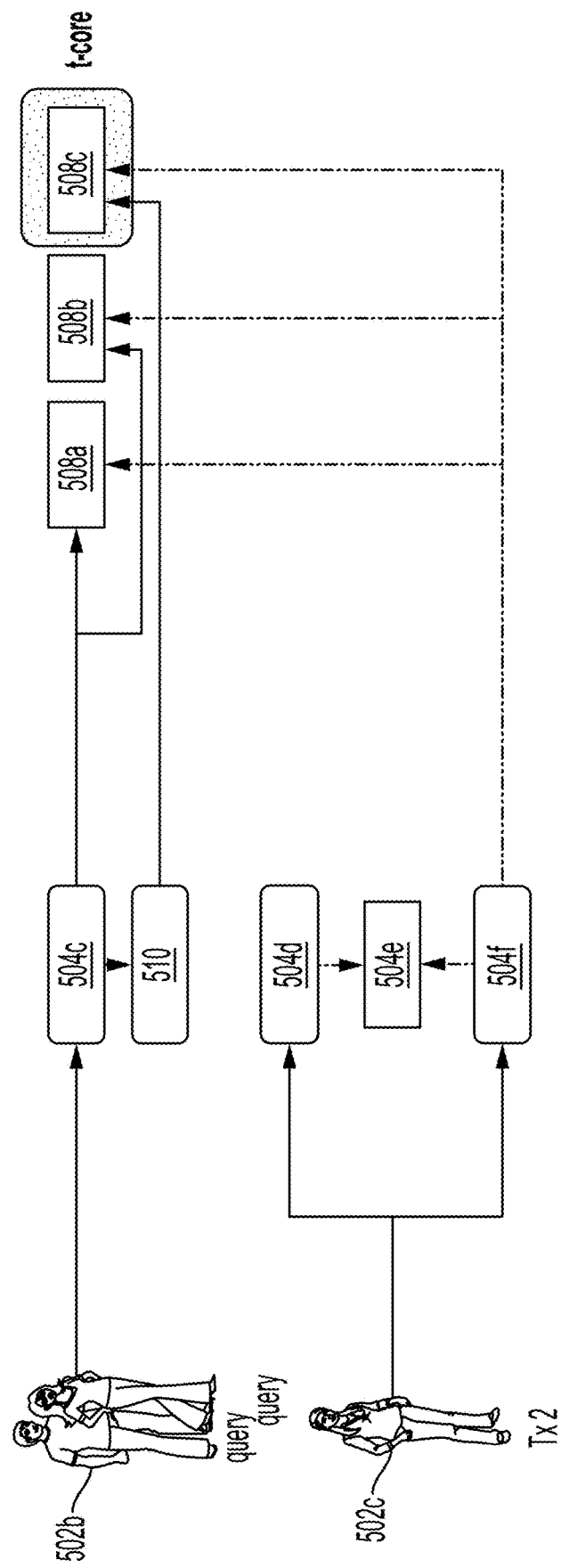
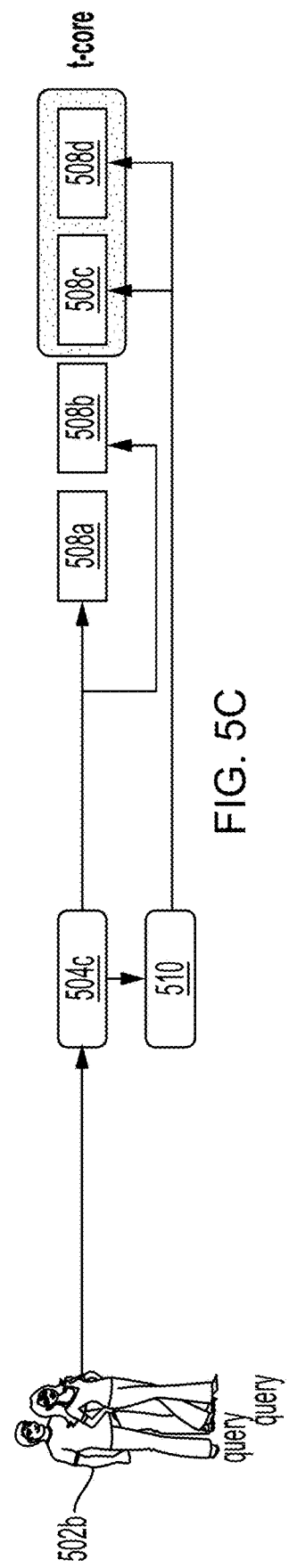
FIG. 5B
FIG. 5C

| | SELECT requests (access.log) | | Add / Update | | Commit Time | |
|---|---|---|---|---|---|---|
| | | # of queries | BatchSize = 10, maintenance/min ~8 indexing/commits per second | # of adds | | # of commits |
| 702a — (s-core) leader | 3656.97 | 2821 | 10558.2 | 15049 | 7968.21 — 704a | 15086 — 706a |
| 702b — (s-core) | 4148.63 | 2909 | 11936.3 | 15018 | 24753.7 | 15000 |
| | | | BatchSize = 10, maintenance/min ~8 indexing/commits per second | | | |
| 702a — (s-core) leader | 1446.49 | 4280 | 272.827 | 15008 | 1460.47 — 704b | 30 — 706b |
| 702b — (s-core) | 1544.63 | 4432 | 245.01 | 15010 | 1182.7 | 30 |
| 703a — (t-core) | 21.4894 | 4414 | 135.871 | 15063 | 92.8387 | 15001 |
| 703b — (t-core) leader | 23.6442 | 4328 | 154.59 | 15050 | 111.838 | 15001 |

FIG. 7

```
┌─────────────────────────────────────────────────────────────────────────────┐
│ DETERMINING A FIRST DATA STORE FOR A SECURE STORAGE SYSTEM, THE FIRST DATA  │
│ STORE COMPRISING A FIRST PLURALITY OF INDICES HAVING A FIRST SIZE AND       │
│ STORED WITHIN A FIRST COMPUTING STORAGE STRUCTURE ASSOCIATED WITH THE       │
│ SECURE STORAGE SYSTEM                                                       │
│ 802                                                                         │
└─────────────────────────────────────────────────────────────────────────────┘
                                      ↓
┌─────────────────────────────────────────────────────────────────────────────┐
│ DETERMINING, BASED ON A FIRST COMPUTING OPERATION ASSOCIATED WITH THE FIRST │
│ DATA STORE, A SECOND DATA STORE FOR THE SECURE STORAGE SYSTEM, WHEREIN:     │
│ THE SECOND DATA STORE COMPRISES A SECOND PLURALITY OF INDICES HAVING A      │
│ SECOND SIZE THAT IS SMALLER RELATIVE TO THE FIRST SIZE OF THE FIRST DATA    │
│ STORE; AND THE SECOND DATA STORE IS STORED WITHIN A SECOND COMPUTING        │
│ STORAGE STRUCTURE ASSOCIATED WITH THE SECURE STORAGE SYSTEM AND COMPRISES   │
│ ONE OF: NEW DATA THAT IS ABSENT FROM THE FIRST DATA STORE, OR SECOND DATA   │
│ THAT IS A SUBSET OF FIRST DATA COMPRISED IN THE FIRST DATA STORE            │
│ 804                                                                         │
└─────────────────────────────────────────────────────────────────────────────┘
                                      ↓
┌─────────────────────────────────────────────────────────────────────────────┐
│ RECEIVING, A FIRST COMPUTING COMMAND CONFIGURED TO IMPLEMENT ONE OR MORE    │
│ OF: A DATA UPDATE COMPUTING OPERATION ON ONE OR MORE OF THE FIRST DATA OR   │
│ THE SECOND DATA; OR A DATA DELETION COMPUTING OPERATION ON ONE OR MORE OF   │
│ THE FIRST DATA OR THE SECOND DATA                                           │
│ 806                                                                         │
└─────────────────────────────────────────────────────────────────────────────┘
                                      ↓
┌─────────────────────────────────────────────────────────────────────────────┐
│ EXECUTING A PRIORITIZATION COMPUTING OPERATION, BASED ON THE FIRST          │
│ COMPUTING COMMAND, ASSOCIATED WITH THE FIRST DATA OF THE FIRST DATA STORE   │
│ OR THE SECOND DATA OF THE SECOND DATA STORE                                 │
│ 808                                                                         │
└─────────────────────────────────────────────────────────────────────────────┘
                                      ↓
┌─────────────────────────────────────────────────────────────────────────────┐
│ EXECUTING, BASED ON THE PRIORITIZATION COMPUTING OPERATION, THE FIRST       │
│ COMPUTING COMMAND ON AT LEAST ONE DATA ELEMENT COMPRISED IN THE SECOND      │
│ DATA OF THE SECOND DATA STORE AND THEREBY GENERATE AND STORE AN UPDATED     │
│ SET OF DATA ELEMENTS WITHIN THE SECOND DATA STORE                           │
│ 810                                                                         │
└─────────────────────────────────────────────────────────────────────────────┘
                                      ↓
┌─────────────────────────────────────────────────────────────────────────────┐
│ INITIATING A DEDUPLICATION COMPUTING OPERATION BY SELECTIVELY MARKING,      │
│ BASED ON THE UPDATED SET OF DATA ELEMENTS OF THE SECOND DATA STORE,         │
│ CORRESPONDING SET OF DATA ELEMENTS WITHIN THE FIRST DATA STORE              │
│ 812                                                                         │
└─────────────────────────────────────────────────────────────────────────────┘
                                      ↓
┌─────────────────────────────────────────────────────────────────────────────┐
│ MERGING, BASED ON THE SELECTIVELY MARKING, THE UPDATED SET OF DATA          │
│ ELEMENTS WITHIN THE SECOND DATA STORE WITH THE CORRESPONDING SET OF DATA    │
│ ELEMENTS WITHIN THE FIRST DATA STORE                                        │
│ 814                                                                         │
└─────────────────────────────────────────────────────────────────────────────┘
```

FIG. 8

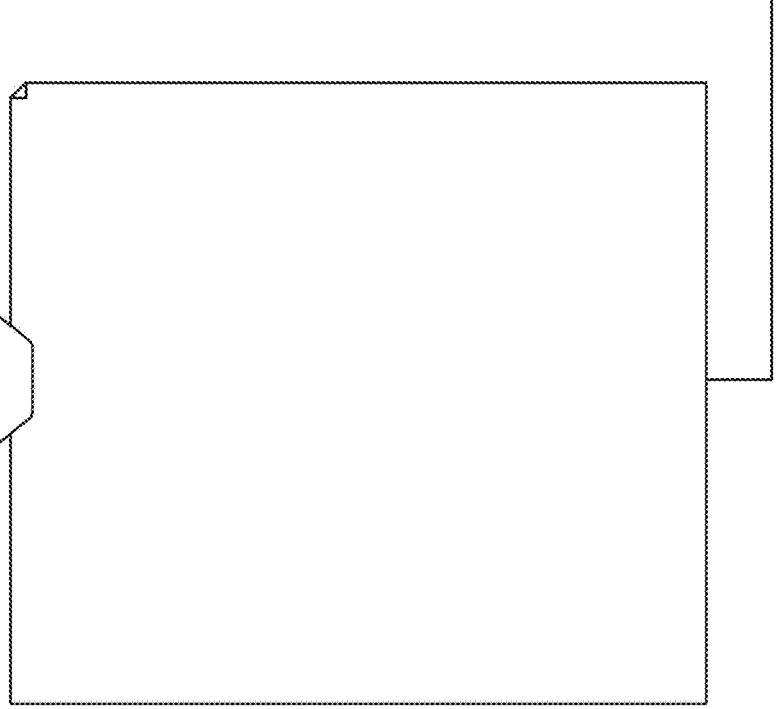
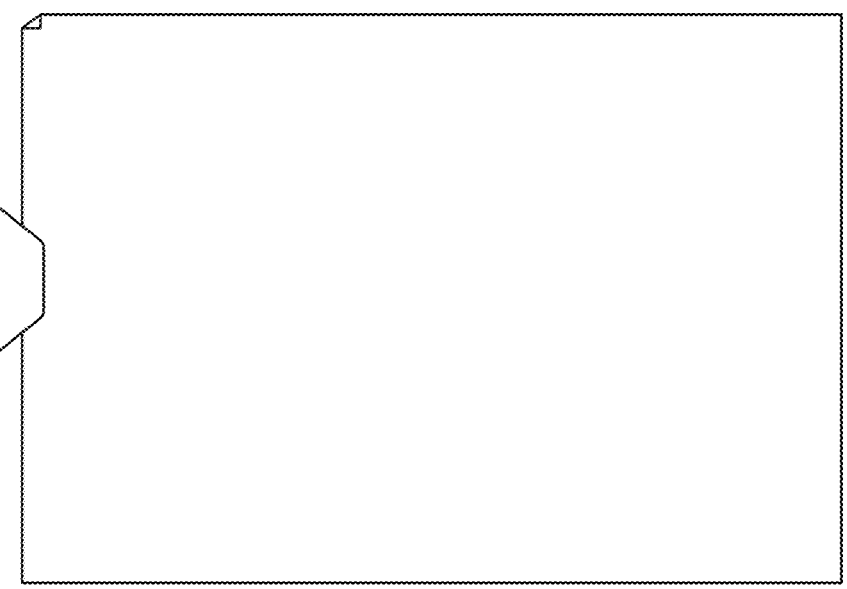
FIG. 11B

```
┌─────────────────────────────────────────────────────────────────────────────┐
│ COMMUNICATIVELY COUPLING, AN OBJECT DATABASE, A FIRST APPLICATION, AND A    │
│ SECOND APPLICATION TO FORM THE SECURE STORAGE NETWORK                       │
│                                   1202                                      │
└─────────────────────────────────────────────────────────────────────────────┘
                                      │
                                      ▼
┌─────────────────────────────────────────────────────────────────────────────┐
│ ACTIVATING, BASED ON THE COMMUNICATIVELY COUPLING, A PLURALITY OF PRIMARY   │
│ DATA STORES THAT ARE CONFIGURED TO STORE INDEX DATA CORRESPONDING TO A      │
│ PLURALITY OF DATA OBJECTS STORED IN THE OBJECT DATABASE, SUCH THAT AT LEAST │
│ ONE DATA STORE OF THE PLURALITY OF PRIMARY DATA STORES HAS A FIRST SIZE     │
│                                   1204                                      │
└─────────────────────────────────────────────────────────────────────────────┘
                                      │
                                      ▼
┌─────────────────────────────────────────────────────────────────────────────┐
│ ACTIVATING, BASED ON THE ACTIVATED PLURALITY OF PRIMARY DATA STORES: A      │
│ PLURALITY OF SECONDARY DATA STORES THAT CORRESPOND TO, AND ARE SEPARATE     │
│ FROM, THE PLURALITY OF PRIMARY DATA STORES, SUCH THAT AT LEAST ONE DATA     │
│ STORE OF THE PLURALITY OF SECONDARY DATA STORES HAS A SECOND SIZE THAT IS   │
│ SMALLER THAN THE FIRST SIZE AND IS CONFIGURED TO STORE INDEX DATA, AND A    │
│ PLURALITY OF TERTIARY DATA STORES THAT CORRESPOND TO, AND ARE SEPARATE      │
│ FROM, THE PLURALITY OF SECONDARY DATA STORES                                │
│                                   1206                                      │
└─────────────────────────────────────────────────────────────────────────────┘
                                      │
                                      ▼
┌─────────────────────────────────────────────────────────────────────────────┐
│ SELECTING: A FIRST PRIMARY DATA STORE OF THE PLURALITY OF PRIMARY DATA      │
│ STORES; A FIRST SECONDARY DATA STORE OF THE PLURALITY OF SECONDARY DATA     │
│ STORES; A FIRST TERTIARY DATA STORE OF THE PLURALITY OF TERTIARY DATA       │
│ STORES; AND A SECOND TERTIARY DATA STORE OF THE PLURALITY OF TERTIARY DATA  │
│ STORES                                                                      │
│                                   1208                                      │
└─────────────────────────────────────────────────────────────────────────────┘
                                      │
                                      ▼
┌─────────────────────────────────────────────────────────────────────────────┐
│ LOADING: A FIRST SET OF DATA INDICES INTO THE FIRST PRIMARY DATA STORE; A   │
│ SECOND SET OF DATA INDICES CORRESPONDING TO THE FIRST SET OF DATA INDICES   │
│ INTO THE FIRST SECONDARY DATA STORE; A THIRD SET OF DATA INDICES            │
│ CORRESPONDING TO THE SECOND SET OF DATA INDICES INTO THE FIRST TERTIARY     │
│ DATA STORE; AND THE THIRD SET OF DATA INDICES CORRESPONDING TO THE SECOND   │
│ SET OF DATA INDICES INTO THE SECOND TERTIARY DATA STORE                     │
│                                   1210                                      │
└─────────────────────────────────────────────────────────────────────────────┘
                                      │
                                      ▼
┌─────────────────────────────────────────────────────────────────────────────┐
│ MODIFYING, BASED ON THE FIRST APPLICATION OR THE SECOND APPLICATION: AT     │
│ LEAST ONE FIRST DATA ELEMENT COMPRISED IN THE THIRD SET OF DATA INDICES     │
│ WITHIN THE FIRST TERTIARY DATA STORE TO GENERATE A FIRST MODIFIED DATA      │
│ ELEMENT; AND AT LEAST ONE SECOND DATA ELEMENT COMPRISED IN THE THIRD SET    │
│ OF DATA INDICES WITHIN THE SECOND TERTIARY DATA STORE TO GENERATE A SECOND  │
│ MODIFIED DATA ELEMENT, WHEREIN: THE MODIFYING THE AT LEAST ONE FIRST DATA   │
│ ELEMENT COMPRISED IN THE THIRD SET OF DATA INDICES WITHIN THE FIRST         │
│ TERTIARY DATA STORE IS COMPUTATIONALLY ISOLATED FROM THE MODIFYING THE AT   │
│ LEAST ONE SECOND DATA ELEMENT COMPRISED IN THE THIRD SET OF DATA INDICES    │
│ WITHIN THE SECOND TERTIARY DATA STORE, THE FIRST MODIFIED DATA ELEMENT AND  │
│ THE SECOND MODIFIED DATA ELEMENT ARE SEPARABLE BASED ON TEMPORAL DATA       │
│ ASSOCIATED WITH THE FIRST MODIFIED DATA ELEMENT AND THE SECOND MODIFIED     │
│ DATA ELEMENT                                                                │
│                                   1212                                      │
└─────────────────────────────────────────────────────────────────────────────┘
                                      │
                                      ▼
┌─────────────────────────────────────────────────────────────────────────────┐
│ EXECUTING, BASED ON THE TEMPORAL DATA, A FIRST PRIORITIZATION COMPUTING     │
│ OPERATION, TO SELECT ONE OF THE FIRST MODIFIED DATA ELEMENT AND THE SECOND  │
│ MODIFIED DATA ELEMENT                                                       │
│                                   1214                                      │
└─────────────────────────────────────────────────────────────────────────────┘
                                      │
                                      ▼
┌─────────────────────────────────────────────────────────────────────────────┐
│ INITIATING, BASED ON THE FIRST PRIORITIZATION COMPUTING OPERATION, A FIRST  │
│ DATA DEDUPLICATION COMPUTING OPERATION BY SELECTIVELY MARKING DATA          │
│ ELEMENTS WITHIN THE FIRST SECONDARY DATA STORE THAT MAP TO THE ONE OF THE   │
│ FIRST MODIFIED DATA ELEMENT AND THE SECOND MODIFIED DATA ELEMENT            │
│                                   1216                                      │
└─────────────────────────────────────────────────────────────────────────────┘
                                      │
                                      ▼
┌─────────────────────────────────────────────────────────────────────────────┐
│ MERGING, BASED ON THE SELECTIVELY MARKING, THE ONE OF THE FIRST MODIFIED    │
│ DATA ELEMENT AND THE SECOND MODIFIED DATA ELEMENT WITH DATA ELEMENTS        │
│ COMPRISED IN THE FIRST SECONDARY DATA STORE.                                │
│                                   1218                                      │
└─────────────────────────────────────────────────────────────────────────────┘
```

FIG. 12

```
┌─────────────────────────────────────────────────────────────────────────────┐
│ COMMUNICATIVELY COUPLING AN OBJECT DATABASE, A FIRST APPLICATION, AND A     │
│ SECOND APPLICATION TO FORM THE SECURE STORAGE NETWORK                        │
│                                    1302                                      │
└─────────────────────────────────────────────────────────────────────────────┘
                                      ▼
┌─────────────────────────────────────────────────────────────────────────────┐
│ ACTIVATING, BASED ON THE COMMUNICATIVELY COUPLING, A PLURALITY OF PRIMARY   │
│ DATA STORES THAT ARE CONFIGURED TO STORE INDEX DATA CORRESPONDING TO A      │
│ PLURALITY OF DATA OBJECTS STORED IN THE OBJECT DATABASE, SUCH THAT AT LEAST │
│ ONE DATA STORE OF THE PLURALITY OF PRIMARY DATA STORES HAS A FIRST SIZE,    │
│ THEREBY RESULTING IN AN ACTIVATED PLURALITY OF PRIMARY DATA STORES          │
│                                    1304                                      │
└─────────────────────────────────────────────────────────────────────────────┘
                                      ▼
┌─────────────────────────────────────────────────────────────────────────────┐
│ ACTIVATING, BASED ON THE ACTIVATED PLURALITY OF PRIMARY DATA STORES: A      │
│ PLURALITY OF SECONDARY DATA STORES THAT CORRESPOND TO, AND ARE SEPARATE     │
│ FROM, THE PLURALITY OF PRIMARY DATA STORES, SUCH THAT AT LEAST ONE          │
│ SECONDARY DATA STORE OF THE PLURALITY OF SECONDARY DATA STORES HAS A        │
│ SECOND SIZE THAT IS SMALLER THAN THE FIRST SIZE AND IS CONFIGURED TO STORE  │
│ THE INDEX DATA; AND A PLURALITY OF TERTIARY DATA STORES THAT CORRESPOND TO, │
│ AND ARE SEPARATE FROM, THE PLURALITY OF SECONDARY DATA STORES               │
│                                    1306                                      │
└─────────────────────────────────────────────────────────────────────────────┘
                                      ▼
┌─────────────────────────────────────────────────────────────────────────────┐
│ SELECTING: A FIRST PRIMARY DATA STORE OF THE PLURALITY OF PRIMARY DATA      │
│ STORES; A FIRST SECONDARY DATA STORE OF THE PLURALITY OF SECONDARY DATA     │
│ STORES; A FIRST TERTIARY DATA STORE OF THE PLURALITY OF TERTIARY DATA       │
│ STORES; AND A SECOND TERTIARY DATA STORE OF THE PLURALITY OF TERTIARY DATA  │
│ STORES                                                                       │
│                                    1308                                      │
└─────────────────────────────────────────────────────────────────────────────┘
                                      ▼
┌─────────────────────────────────────────────────────────────────────────────┐
│ CREATING: A FIRST SET OF DATA INDICES IN THE FIRST TERTIARY DATA STORE,     │
│ WHEREIN: THE FIRST SET OF DATA INDICES COMPRISE NEW DATA INDICES            │
│ CORRESPONDING TO NEW DATA OBJECTS THAT ARE: NEWLY STORED IN THE OBJECT      │
│ DATABASE, OR THAT ARE BEING CONDITIONED FOR STORAGE IN THE OBJECT DATABASE; │
│ THE FIRST SET OF DATA INDICES IS DIFFERENT FROM A SECOND SET OF DATA        │
│ INDICES IN THE FIRST SECONDARY DATA STORE THAT CORRESPOND TO EXISTING DATA  │
│ OBJECTS PREVIOUSLY STORED IN THE OBJECT DATABASE; THE CREATING OF THE FIRST │
│ SET OF DATA INDICES IN THE FIRST TERTIARY DATA STORE IS COMPUTATIONALLY     │
│ ISOLATED FROM CREATING OR MODIFYING A THIRD SET OF DATA INDICES WITHIN THE  │
│ SECOND TERTIARY DATA STORE; AND DATA CHANGES WITHIN THE FIRST TERTIARY DATA │
│ STORE ARE SEPARABLE FROM DATA CHANGES WITHIN THE SECOND TERTIARY DATA       │
│ STORE BASED ON TEMPORAL DATA OF COMPUTING OPERATIONS EXECUTED WITHIN THE    │
│ SECURE STORAGE NETWORK                                                       │
│                                    1310                                      │
└─────────────────────────────────────────────────────────────────────────────┘
                                      ▼
┌─────────────────────────────────────────────────────────────────────────────┐
│ EXECUTING, BASED ON THE TEMPORAL DATA, A PRIORITIZATION COMPUTING OPERATION,│
│ TO SELECT ONE OF THE FIRST SET OF DATA INDICES AND THE THIRD SET OF DATA    │
│ INDICES                                                                      │
│                                    1312                                      │
└─────────────────────────────────────────────────────────────────────────────┘
                                      ▼
┌─────────────────────────────────────────────────────────────────────────────┐
│ INITIATING, BASED ON THE PRIORITIZATION COMPUTING OPERATION, A DATA UPDATE  │
│ OR A DATA WRITE COMPUTING OPERATION WITHIN THE FIRST PRIMARY DATA STORE BY  │
│ MERGING THE SECOND SET OF DATA INDICES WITHIN THE FIRST SECONDARY DATA      │
│ STORE WITH ONE OF: THE FIRST SET OF DATA INDICES; AND THE THIRD SET OF DATA │
│ INDICES                                                                      │
│                                    1314                                      │
└─────────────────────────────────────────────────────────────────────────────┘
```

FIG. 13

SYSTEMS AND METHODS FOR DATA ACCESS ACCELERATION AND CONTROL WITHIN A SECURE STORAGE NETWORK

CROSS-REFERENCE TO RELATED APPLICATIONS

This application claims priority to, and is a continuation-in-part of, U.S. application Ser. No. 18/638,574, filed on Apr. 17, 2024, titled "Dynamic Methods For Improving Query Performance For A Secure Storage System," which is incorporated herein by reference in its entirety for all purposes.

TECHNICAL FIELD

This disclosure is directed to improving or optimizing data access and control using multiple data storage structures associated with a secure storage network.

BACKGROUND

In managing vast amounts of data, it often occurs that data samples being operated on and stored in similar or dissimilar data stores by a first set of users may not be sufficiently isolated from access by a second set of users leading to dirty data read scenarios where the second set of users access data still undergoing modification.

Furthermore, as data samples are being operated on by the first set of users, there is a need to manage the data samples in a way that prioritizes access and/or storage of the data samples based on temporal data associated with the operations being executed on the data samples.

In addition, there is a need to develop data storage structures that beneficially enable speedy access, retrieval, update, or storage of data samples within a secure storage network.

SUMMARY

The disclosed solution comprises methods, systems, and computer program products for controlling and speeding up data access in a secure storage network. According to an embodiment, a method for controlling and speeding up data access in a secure storage network comprises: communicatively coupling an object database, a first application, and a second application to form the secure storage network; activating, based on the communicatively coupling, a plurality of primary data stores that are configured to store index data corresponding to a plurality of data objects stored in the object database, such that at least one data store of the plurality of primary data stores has a first size; and activating, based on the activated plurality of primary data stores: a plurality of secondary data stores that correspond to, and are separate from, the plurality of primary data stores, such that at least one data store of the plurality of secondary data stores has a second size that is smaller than the first size and is configured to store index data, and a plurality of tertiary data stores that correspond to, and are separate from, the plurality of secondary data stores.

The method also includes selecting: a first primary data store of the plurality of primary data stores; a first secondary data store of the plurality of secondary data stores; a first tertiary data store of the plurality of tertiary data stores; and a second tertiary data store of the plurality of tertiary data stores. The method further comprises loading: a first set of data indices into the first primary data store; a second set of data indices corresponding to the first set of data indices into the first secondary data store; a third set of data indices corresponding to the second set of data indices into the first tertiary data store; and the third set of data indices corresponding to the second set of data indices into the second tertiary data store.

In some embodiments, the method includes modifying, based on the first application or the second application: at least one first data element comprised in the third set of data indices within the first tertiary data store to generate a first modified data element; and at least one second data element comprised in the third set of data indices within the second tertiary data store to generate a second modified data element. It is appreciated that modifying the at least one first data element comprised in the third set of data indices within the first tertiary data store is computationally isolated from the modifying the at least one second data element comprised in the third set of data indices within the second tertiary data store. It is further appreciated that the first modified data element and the second modified data element are separable based on temporal data associated with the first modified data element and the second modified data element.

In some implementations, the method includes: executing, based on the temporal data, a first prioritization computing operation, to select one of the first modified data element and the second modified data element; and initiating, based on the first prioritization computing operation, a first data deduplication computing operation by selectively marking data elements within the first secondary data store that map to the one of the first modified data element and the second modified data element. In addition, the method includes merging, based on the selectively marking, the one of the first modified data element and the second modified data element with data elements comprised in the first secondary data store.

In another embodiment, a system and a computer program product can include or execute the method described above. These and other implementations may each optionally include one or more of the following features.

According to one embodiment, the above method comprises receiving, prior to executing the first prioritization computing operation, a first computing command associated with the first modified data element or the second modified data element, such that the first computing command comprises a query configured to implement one or more of: a first data update computing operation based on the first modified data element or the second modified element within the first secondary data store of the plurality of secondary data stores; or a first data deletion computing operation sociated with first modified data element or the second modified element within the first secondary data store of the plurality of secondary data stores. According to some embodiments, the first computing command is associated with at least one of: creating a first data record for storage in the object database based on the index data; reading a second data record stored in the object database based on the index data; updating a third data record stored in the object database based on the index data; and searching a plurality of records stored in the object database based on the index data.

It is appreciated that the secure storage network is configured to receive a plurality of input query commands, such that the plurality of primary data stores, the plurality of secondary data stores, and the plurality of tertiary data stores enable at least one of: separating execution of the plurality of input query commands and thereby speed execution of each of the plurality of input query commands; synchronously or asynchronously executing the plurality of input query commands and thereby generating a plurality of temporal data; detecting and eliminating duplicated index data within one or more of the plurality of primary data stores, the plurality of secondary data stores, and the plurality of tertiary data stores based on the temporal data; and preventing dirty read computing operations based on the plurality of input query commands.

It is further appreciated that the first application is configured to adaptively impose a customizable data structure on one or more data objects within the object database; and the second application is configured to instantiate data indices or an inverted data index corresponding to one or more data objects within the object database. Furthermore, the second application is configured to enable querying the object database as an inverted storage index.

In some cases, the first application is configured to generate a first log file for determining or tracking computing operations occurring in one or more of the first tertiary data store or the second tertiary data store. In addition, the secure storage network can adaptively generate a second log file for detecting or recording data events or data interactions among the first application, the second application, and the object database. Moreover, the first log file and the second log file can be applied by the secure storage system, to maintain data consistency within at least the object database of the secure storage network.

According to one embodiment, the plurality of primary data stores and the plurality of secondary data stores and the plurality of tertiary data stores comprise an inverted storage index associated with a record or a file, such that search terms associated with a computing input (e.g., computing command) to the secure storage network is mapped to the record or the file using at least one of the plurality of primary data stores or the plurality of secondary data stores.

In some embodiments, the merging referenced above comprises: searching the first secondary data store generate search data; generating, based on the search data, identifier data comprising a document identifier list associated with the selectively marking; deleting, during a data maintenance computing stage of the first secondary data store, data elements within the first secondary data store that correspond to one of the first modified data element and the second modified data element; and in response to the deleting, one of the first modified data element and the second modified data element with data elements comprised in the first secondary data store.

According to some embodiments, a management computing sub-system associated with the secure storage network coordinates data operations among the plurality of primary data stores, the plurality of secondary data stores, and the plurality of tertiary data stores.

The above method further includes receiving a second input command comprising a search parameter associated with a file or record stored within the object database; and in response to executing the second input command based on one or more of the plurality of primary data stores, the plurality of secondary data stores, and the plurality of tertiary data stores, initiating generation of a visualization on a graphical display that indicates the file or the record or an updated file or an updated record.

In exemplary implementations, data comprised in one or more of the plurality of primary data stores, the plurality of secondary data stores, or the plurality of tertiary data stores indicate, or is associated with, a denormalized copy of data objects stored in the object database.

It is appreciated that a document or a file comprised in the object database is represented within the secure storage network as data record elements spread across two or more data storage structures including data tables. It is further appreciated that the denormalized copy of data objects indicate a consolidation of data record elements spread across the two or more data storage structures.

In one embodiment, the first tertiary data store or the second tertiary data store has a third size that is smaller than the second size of the plurality of secondary data stores.

In some instances, the above method further includes: determining a plurality of temporal data for the plurality of secondary data stores; executing, based on the plurality of temporal data, a second prioritization computing operation to select a plurality of modified data elements associated with the plurality of secondary data stores; initiating, based on the second prioritization computing operation, a second data deduplication computing operation by selectively marking data elements within the plurality of primary data stores that map to the plurality of modified data elements associated with the plurality of secondary data stores; and merging, based on selectively marking the data elements within the plurality of primary data stores, the plurality of modified data elements with data elements comprised in the plurality of primary data stores.

It is appreciated that the plurality of primary data stores comprise a plurality of data shards optimized for storing index data associated with data objects within the object database of the secure storage network. It is further appreciated that the secure storage network is comprised in a cloud computing system configured to receive text-based queries that are processed using at least one of the first application or the second application.

BRIEF DESCRIPTION OF THE DRAWINGS

The disclosure is illustrated by way of example, and not by way of limitation in the figures of the accompanying drawings in which like reference numerals are used to refer to similar elements. It is appreciated that various features may not be drawn to scale and the dimensions of various features may be arbitrarily increased or reduced for clarity of discussion. Further, some components may be omitted in certain figures for clarity of discussion.

FIGS. 4A and 4B show a second plurality of users submitting computing operation requests including read/write queries to the disclosed database according to some embodiments of this disclosure.

FIGS. 5A, 5B, and 5C show a third plurality of users submitting computing operation requests including read/write queries to the disclosed database according to some embodiments of this disclosure.

FIG. 7 shows a table indicating performance data for implementations associated with FIG. 6B according to some embodiments of this disclosure.

FIG. 8 shows an exemplary flowchart for improving query performance for a secure storage system according to some embodiments of this disclosure.

FIGS. 11A-11B show an exemplary leveraging of log files to maintain data consistency or data accuracy within the object data base referenced in association with FIG. 10

FIG. 12 shows a first exemplary workflow for controlling and speeding up data access in a secure storage network.

FIG. 13 illustrates a second exemplary workflow for controlling and speeding up data access in a secure storage network.

Although similar reference numbers for the foregoing drawings may be used to refer to similar elements for convenience, it is appreciated that each of the various exemplary embodiments may be considered to be distinct variations. As used in this disclosure, the terms "embodiment," "example embodiment," "exemplary embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems and networks have not been described in detail so as not to unnecessarily obscure aspects of the disclosed embodiments.

System Environment

Figure 1A:
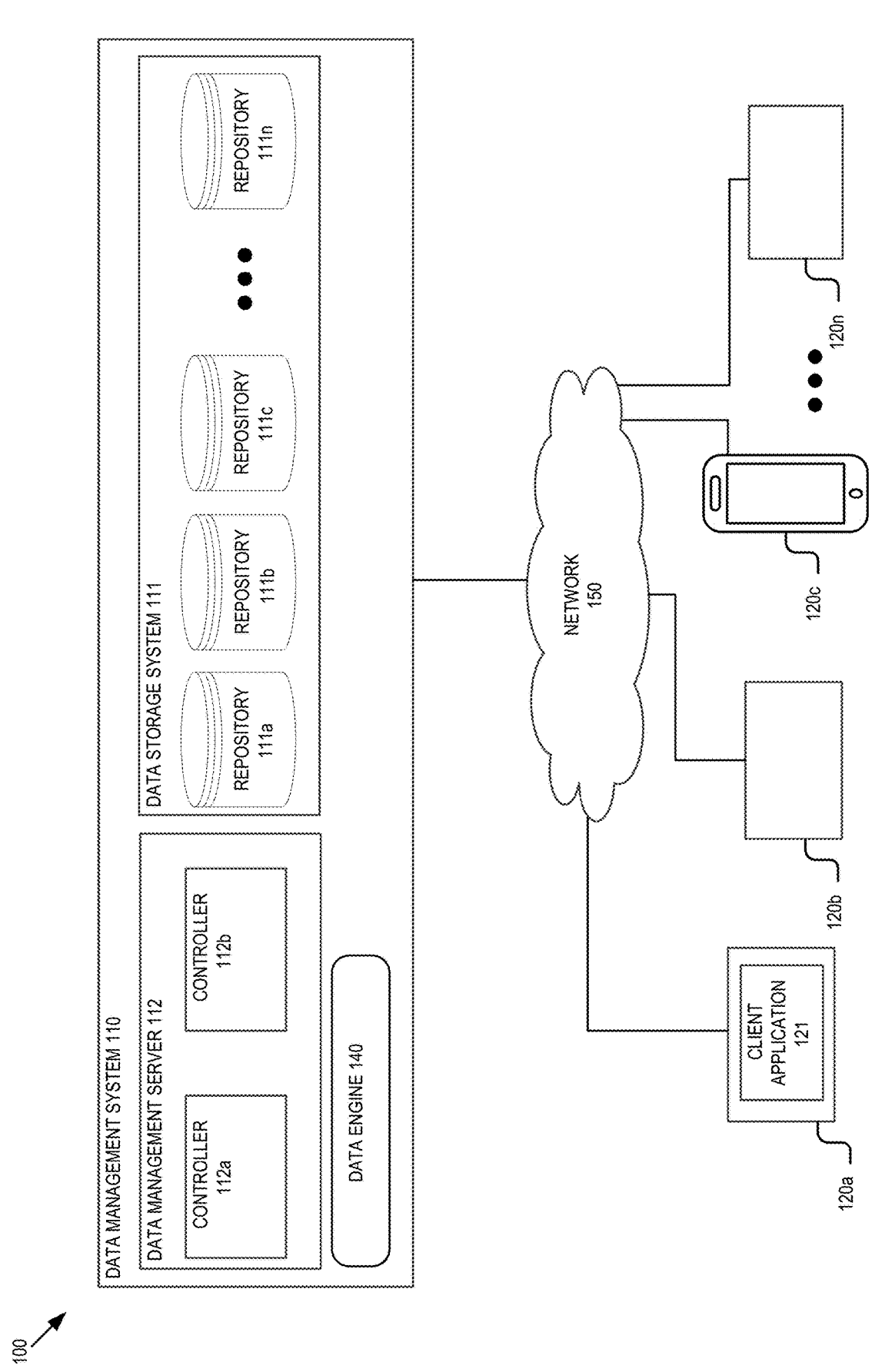
FIG. 1A illustrates an example high level block diagram of a data management architecture within which the present technology may be implemented according to some embodiments of this disclosure.

FIG. 1A illustrates an example high level block diagram of a data management architecture 100 within which the present technology may be implemented. As shown, the architecture 100 may include a data management system 110 (also referred to as a secure storage system 110 elsewhere herein), and a plurality of user computing devices 120a, 120b, ... 120n coupled to each other via a network 150. The data management system 110 may include a data storage system 111 and a data management server 112. The data storage system 111 may have one or more secure repositories 111a, 111b, 111c, ... 111n. Each of the one or more secure repositories 111a, 111b, 111c, ... 111n may comprise two or more secure storage structures adapted to store, at least index data and/or file data, and/or record data as the case may require. For example, the data storage system 111 may comprise secure data and/or computing storage structures that securely store data indices, files associated with said data indices, and/or records associated with said data indices.

The network 150 may include one or more types of communication networks such as a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a, ... 120n may be any machine or system that is used by a user to access the data management system 110 via the network 150, and may comprise computing devices including laptop computers, desktop computers, mobile phones, smart phones, tablet computers, and netbooks. A client application 121 (e.g., a secure interface) may be run from a user computing device (e.g., 120a) to securely access data in the data management system 110 via the network 150.

The data storage system 111 may store data that client applications (e.g., client application 121) in user computing devices 120a ... 120n may access and may comprise any commercially available storage devices. Each content repository (e.g., 111a, 111b, 111c, ... or 111n) may store a specific category of data, and allow users to interact with said data in a specific context. It is appreciated that the disclosed content repositories may comprise separate logic sections in the same storage device. According to one embodiment, the content stored in the content repositories 111a, 111b, 111c, ... or 111n may comprise controlled content stored in specialized databases including at least one source of truth database within said repositories such that specific users and/or specific computing devices may be provided credential access based on one or more profiles of the specific users and/or specific devices previously stored or otherwise associated with the data management system 110.

According to one embodiment, each of the content repositories 111a, 111b, 111c, ... 111n can be implemented as one or more computer-readable or machine-readable storage media that are non-transitory. In some embodiments, the content repositories 111a, 111b, 111c, ... 111n may be distributed within and/or across multiple internal and/or external enclosures of a computing system and/or additional computing systems. Furthermore, each of the content repositories 111a, 111b, 111c, ... 111n may comprise one or more similar or dissimilar forms of memory including semiconductor memory devices such as dynamic or static random access memories (DRAMs or SRAMs), erasable and programmable read-only memories (EPROMs), electrically erasable and programmable read-only memories (EE- PROMs) and flash memories; magnetic disks; optical media such as compact disks (CDs) or digital video disks (DVDs), BluRays or other types of optical media; or other types of storage devices.

The data management server 112 may comprise a remote computer system accessible over a remote or local network, such as the network 150. The data management server 112 may store a data management controller 112a and a data collection controller 112b for controlling management and collection of the data. The data management server 112 could be any commercially available computing devices. Although only one server is shown, it is appreciated that the data management system 110 may have a plurality of servers such that the controllers 112a and 112b may be in separate servers. A client application (e.g., client application 121) may be active on one or more user computing devices 120a, . . . , 120n. The corresponding server application may be active on the data management server 112. The client application and the corresponding server application may communicate with each other over the network 150 and thereby provide distributed functionality and allow multiple client applications to take advantage of the information-gathering capabilities of the data management system 110.

Figure 2:
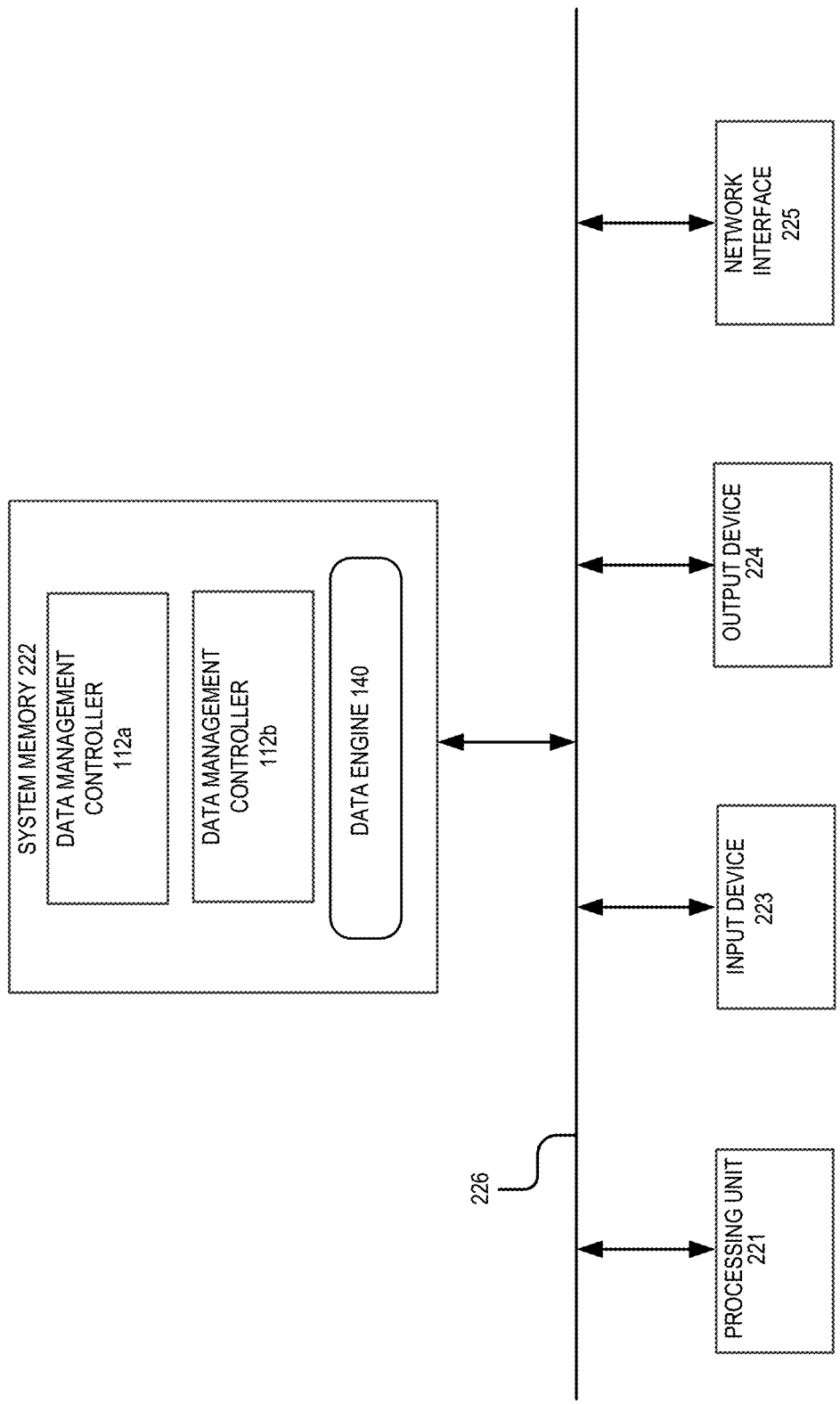
FIG. 2 illustrates an example high level block diagram of the data management system of FIG. 1A according to some embodiments of this disclosure.

The data engine 140 shown within the data management system 110 may include instructions stored in a system memory (e.g., memory 222 of FIG. 2) that are executed by one or more computing device processors (e.g., processing unit 221 of FIG. 2). The instructions may include various operations or processes discussed below in association with, for example, one or more task protocols.

In one embodiment, the architecture 100 may be used for collecting and managing data (e.g., index data, file data, record data, file or record data associated with a trial, etc.). For example, a first repository (e.g., repository 111a) of the architecture 100 may store electronic records or electronic files or index data as the case may require. In some cases, the electronic records comprise electronic data capture (EDC) data and/or trial source data (e.g., associated with a subject). It is appreciated that a trial as described in this disclosure may refer to a clinical trial.

The data management system 110 may have: one or more interfaces for receiving the plurality of data described herein; database or query mechanisms for operating on the plurality of data; and one or more reporting tools for analysis of the plurality of data.

Furthermore, each of the content repositories 111a, 111b, 111c, . . . or 111n may be used by a plurality of sites (e.g., a hospital site, a school site, a research site, a pharmaceutical company site, etc.) to store the plurality of data provided in this disclosure. In one embodiment, the plurality of data comprises source data (e.g., vital statistics data such as blood pressure values, research results values, chemical analysis values, biographic data, bibliographic data, demographic data, test data, etc.) which may be converted to EDC data automatically, and then stored in one or more of the content repositories 111a, 111b, 111c, . . . or 111n. It is appreciated that the EDC data stored in the various content repositories 111a, 111b, 111c, . . . or 111n may be synchronized to ensure that data inconsistencies do not creep into any of the content repositories 111a, 111b, 111c, . . . or 111n. It is further appreciated that each of the content repositories 111a, 111b, 111c, . . . or 111n may have two or more data storage structures such as those discussed in association with FIGS. 3A-8.

In one embodiment, the data management system 110 may comprise a multi-tenant system where various elements of hardware and software are shared by one or more users. For instance, the data management server 110 may simultaneously and securely process requests from a plurality of users, and the data storage system 111 may securely store controlled or secure content for the plurality of users.

In one embodiment, the data management system 110 may run on a cloud computing platform. Users can access the controlled content on the cloud independently by using, for example, a virtual machine image, or acquiring access to a service maintained by a cloud database provider associated with the architecture 100. In one embodiment, the data management system 110 may be provided as Software as a Service ("SaaS") to allow users to access the data management system 110 with a thin client.

Figure 1B:
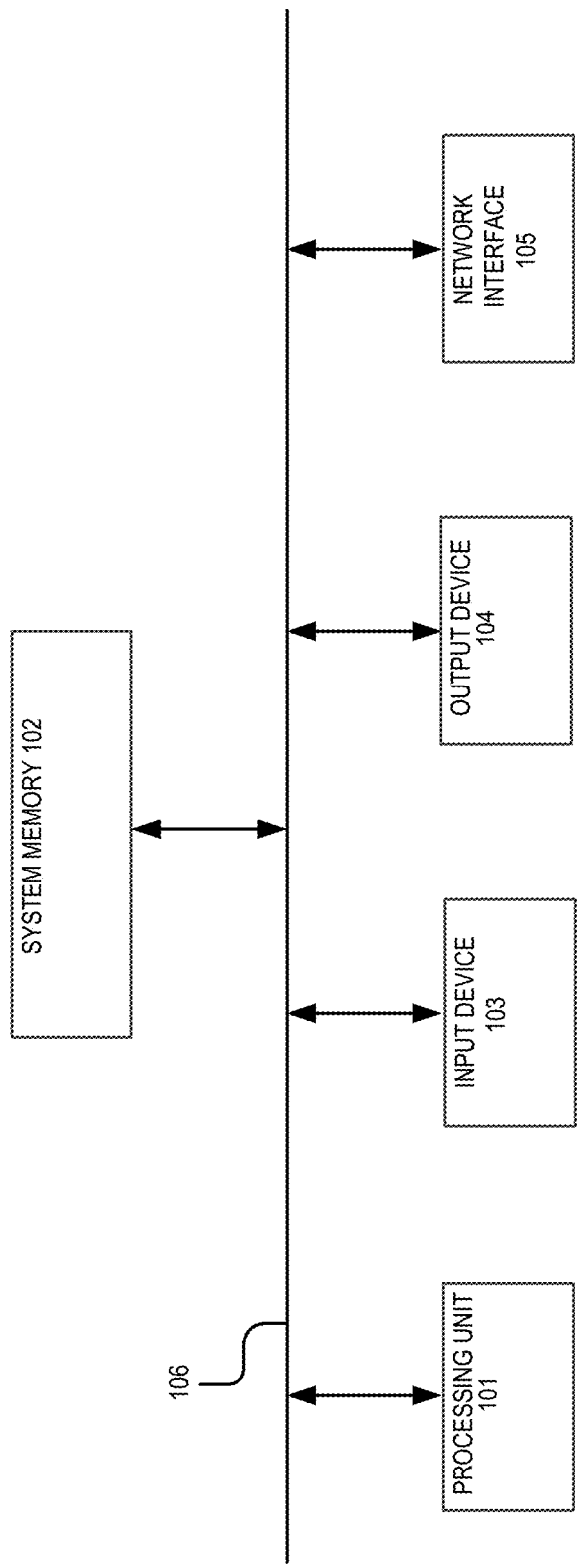
FIG. 1B illustrates an example block diagram of a computing device within which one or more systems or devices of FIG. 1A can be implemented according to some embodiments of this disclosure.

FIG. 1B illustrates an example block diagram of a computing device which can be used as the computing devices 120a, . . . , 120n, and the data management system 110 of FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105, and a system bus 106 that couples these components to each other.

The processing unit 101 may be configured to execute computer instructions or computing operations that are stored in a computer-readable medium, for example, the system memory 102. The processing unit 101 may comprise a central processing unit (CPU).

The system memory 102 includes a variety of computer readable media which may be any available media accessible by the processing unit 101. For instance, the system memory 102 may include computer storage media in the form of volatile and/or non-volatile memory such as read only memory (ROM) and/or random-access memory (RAM). By way of example, but not limitation, the system memory 102 may store instructions and data including an operating system, program sub-systems, various application programs, and program data.

A user can enter computing commands and/or information to the computing device of FIG. 1B through the input device 103. The input device 103 may comprise a keyboard, a touchscreen input device, a touch pad, a mouse, a microphone, and/or an electronic pen.

The computing device of FIG. 1B may provide output data via the output device 104 which may comprise a monitor, a display device (e.g., a display screen of a tablet, cell phone, etc.), a speaker, a printer, or some other output device.

The computing device of FIG. 1B, through the network interface 105, may operate in a networked or distributed environment using logical connections to one or more other computing devices, which may be a personal computer (PC), a server, a router, a network PC, a peer device, a smart phone, or any other media consumption or transmission device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated that the computing device of FIG. 1B could comprise a stationary computing device or a mobile computing device.

FIG. 2 illustrates an example high level block diagram of the data management server 112 according to one embodiment of the present disclosure. The data management server 112 may be implemented by the computing device such as the computing device of FIG. 1B, and may have a processing unit 221, a system memory 222, an input device 223, an output device 224, and a network interface 225, coupled to each other via a system bus 226.

The system memory 222 may comprise data management controllers 112a and 112b. In one embodiment, the data management controllers 112a and 112b may be comprised in one or more applications including a web application or a Java application. In addition, the data management controllers 112a and 112b may be configured to receive and/or store the plurality of data disclosed.

The system memory 222 may also include a data engine 140 or one or more data engines 140 stored in a memory device and which cause a computer processor to execute the various processing stages of FIG. 8 as further discussed below.

EXEMPLARY EMBODIMENTS

The disclosed solution is directed to securely managing data within a database comprising two or more computing storage structures. According to one embodiment, the database is configured or otherwise adapted to provide a user with the ability to define and/or parameterize a data schema or a data framework for data items or data objects stored in the database. For example, the data schema or framework may beneficially enable a user to define a schema comprising document or file or record attributes, and/or document or file or record types. As such data objects stored within the database may be regarded as secure object framework data.

In addition, a user may comprise a first user associated with an entity, a second user associated with an organization, a third user associated with an institution, etc., such that the document or file or record attributes and/or document or file or record types are linked or otherwise tied to a corresponding entity, organization, or institution as the case may require. It is appreciated that the disclosed database automatically isolates or segments data versions comprised in the database such that source of truth data source (e.g., data stored in a source of truth database of the secure storage system) may be determined and used to provide primary, accurate, or benchmark data that can be accessed and operated on. In other words, the disclosed database comprises a source of truth database from which data is loaded into one or more computing storage structures (e.g., t-core and/or s-core) discussed further below to speed up execution of computing commands including queries and/or other data requests or data modification commands on data comprised in the secure storage system.

According to one embodiment, the disclosed database is associated with a structured query language (SQL) architecture, or a MySQL architecture, or an XQuery architecture, or an Object Query Language (OQL) architecture, or an extensible markup language (XML) architecture, or an SQL/XML architecture, or a GraphQL architecture, or a Language Integrated Query (LINQ) architecture, or a data definition language (DDL), or a data manipulation language (DML), or data control language (DCL), or a transactional control language architecture, or an Oracle architecture, or a combination of the foregoing architectures. In addition, one or more computing storage structures (also referred to simply as storage structures elsewhere herein) of the database may have corresponding applications (e.g., a web application) that enable a user to access the database.

According to one embodiment, the data comprised in the database may be divided or sectioned to generate a plurality of data sections or data elements which may be referred to as data shards to improve accessing and/or analyzing the data comprised in the disclosed database. In addition, some implementations of the database use multiple similar or dissimilar data stores.

Furthermore, the data stored in the database disclosed may comprise index data, file data, and record data associated with an entity, an institution, or an organization. In one embodiment, the database (e.g., implemented as a t-core or an s-core computing storage structure) comprises one or more inverted indices and is adapted to receive search queries associated with an index value comprised in the database following which a file or a record associated with the index is accessed and/or operated on. Moreover, the disclosed database is beneficially adapted to have properties including data atomicity, data consistency, data isolation, and data durability.

In addition, the disclosed database ensures that any single document or record can be visible from at least one shard. Moreover, the disclosed database supports data deduplication computing operations that ensure that multiple instances of the same data are consolidated into an up-to-date version of the data in question. In exemplary implementations, the disclosed database provides computing storage structures that isolate a first computing storage structure of the database from computing operations such as rapid commit computing operations by implementing said computing operations on a second computing storage structure of the database and thereby increase or improve performance of the database.

Merge Logic

According to some embodiments, a merge logic associated with the disclosed database enables data reconciliation and/or data harmonization operations to ensure that consistent, accurate, and up-to-date data are easily accessible by a user. The merge logic, for example, may include:

- executing a deduplication computing operation based on search results from a first storage structure (e.g., stable core (s-core)) of the database and a second storage structure (e.g., transaction core (t-core)) of the database;
- for updates and deletes, the files, documents, or records associated with the search are added to the t-core if said files, documents, or records have not yet been stored in the database;
- one or more markers may be assigned to files already in the s-core so that when said files are updated or revised in the t-core, the marked files in the s-core will be deleted before or after merging the s-core data with the t-core data;
- data updates, data additions, and data deletion computing operations can happen on the t-core following which said updates, additions, and deletions are propagated to the s-core before or after the merger;
- data commit computing operations may be allowed on the t-core prior to the data merger, but disabled on the s-core;
- in some cases, after the data merger, the data in the t-core is deleted indicating that after the data merger, commit operations of the data in the s-core triggers deletion of corresponding data in the t-core.

For each computing storage structure of the database, there is a need to manage a complete list of updated and deleted identifiers (e.g., docIds) associated with documents and thereby resolve s-core results data during the merging. For each open or pending computing operation on the database, a list of docIds that are part of the computing operation are managed.

In addition, the size of computing resources used in processing query submissions to the database can be a function of the size of each t-core, the type of data structure used to keep track of the docIds, and the number of computing storage structures of the database. The objective is to avoid directly executing a plurality of commit computing operations to the s-core several times and thereby improve query performance of the database.

Implementation 1

This implementation can be based on:
a single source of truth for the database; and
a caching computing storage structure.

According to one embodiment, records or files associated with the disclosed secure object framework data can be stored using one or more of the above database architecture. An application (e.g., Solr application or an application associated with the secure storage system) may be used for indexing operations associated with the database. In addition, this implementation need not keep stored data representations among the t-core and the s-core in sync real time or near-real time. The storage part (and not the inverted index part) of the dirty-read problem would be solved because in-flight updates to records in the database architecture (e.g., a database based on the MySQL architecture) are visible to a user in the current transaction. Data retrieval in the application can be field based, so that the more there exists a plurality of fields or properties associated with a data object of the database, the more work (e.g., query processing) has to be done for said data object.

In one embodiment, a cache storage structure of the database is maintained for updated and deleted docId lists for efficient retrieval instead of having the application (e.g., Solr application or an application associated with the secure storage system) retrieve the docId list for every merge operation. Deleted DocId lists may need to be updated when deleted docs are added to the t-core. Updated DocId lists may need to be updated when updated docs are added to the t-core.

New DocId lists may not be needed because said DocId lists may not exist in both places (e.g., storage structures of the database), but if they do, the DocId lists comprised in the t-core are prioritized. Furthermore, a transaction DocId list may be keyed on a current computing transaction Identifier (Id) and may contain a list of docIds that belong to the computing transaction in question. The docId lists could be further optimized by splitting the list based on time. After N number of Ids are added to the t-core, a new docId list is created. The original list and each subsequent list may remain in the cache because those Ids have not changed. In one embodiment, a cache computing storage structure for the secure object framework data may be maintained in The database architecture. This cache may not be directed to records that are being modified within a computing transaction. Rather, this cache is used to track committed records. In some cases, a dedicated cache may be used for the application, such that this cache depends on the extent of caching executed for the secure object framework data. Note that this second cache can determine an amount or quantity of documents or records that can be associated with the t-core.

According to one embodiment, merging query results for this implementation may comprise:

Merging Query Results
receiving search results from the s-core and t-core;
obtaining deleted DocId list from cache or retrieve from the application (e.g., Solr application or an application associated with the secure storage system) on cache miss and remove or delete said DocId list from the t-core and s-core search results;
receiving the updated DocId list from cache or retrieve from the application on cache miss and remove the updated DocId list from the s-core results;
merging remaining s-core and t-core results;
retrieving secure object framework data (e.g., records and/or files) from cache or from database architecture on cache miss; and
returning complete results to a user via a graphical interface.

Updating Records Based on the Query
invalidating cache entries;
updating the secure data in the database architecture;
if DocId does not exist in the t-core, invalidate the updated DocId list cache entry;
retrieving secure object framework record from cache; and
sending the secure object framework record to the t-core for indexing.

Deleting Records
invalidating cache entry;
deleting secure object framework record from database architecture;
if docId does not exist in t-core, invalidating deleted DocId list cache entry; and
adding delete marker in t-core.

Adding Records
creating secure object framework data record in database architecture;
adding secure object framework data record to cache; and
sending secure object framework record to t-core for indexing.

Implementation 2

This implementation can involve using the t-core to create filter queries for the s-core. According to one embodiment, this implementation comprises:
executing a caching computing operation associated with a query;
standardizing data representation associated with the query; and
filtering queries on the s-core.

Furthermore, the above steps can be supplemented or complimented by the various implementation operations of Implementation 1 above. In some cases, implementation 2 comprises:

Merging Query Results
obtaining a list of Ids for the t-core from the cache or directly from the t-core on cache miss and modify s-core query to filter the obtained list out of the s-core;
optimizing the database by splitting the DocId list to match shards associated with the database. For example, if 10 s-core shards exist, 10 corresponding DocId lists may be used to build filter queries thereby resulting in 10 t-cores as well;
issuing filtered queries to the s-core, and original queries to the t-core;
merging s-core(s) and t-core(s) results based on Implementation 1 above;
retrieving secure object framework records from cache or from database architecture on cache miss based on the merging; and
return complete results to the query including the secure object framework records.

Updating Records
invalidating cache entry associated with a query;

updating secure object framework record in database architecture;
updating DocId cache;
implementing 1 record per s-core shard;
retrieving secure object framework record from cache; and
sending secure object framework record to t-core for indexing.

Deleting Records
invalidating cache entry;
deleting secure object framework record from database architecture;
updating DocId cache; and
adding a delete marker in t-core.

Adding Records
creating secure object framework record in database architecture;
adding secure object framework record to cache; and
sending secure object framework record to the t-core for indexing.

Figure 3A:
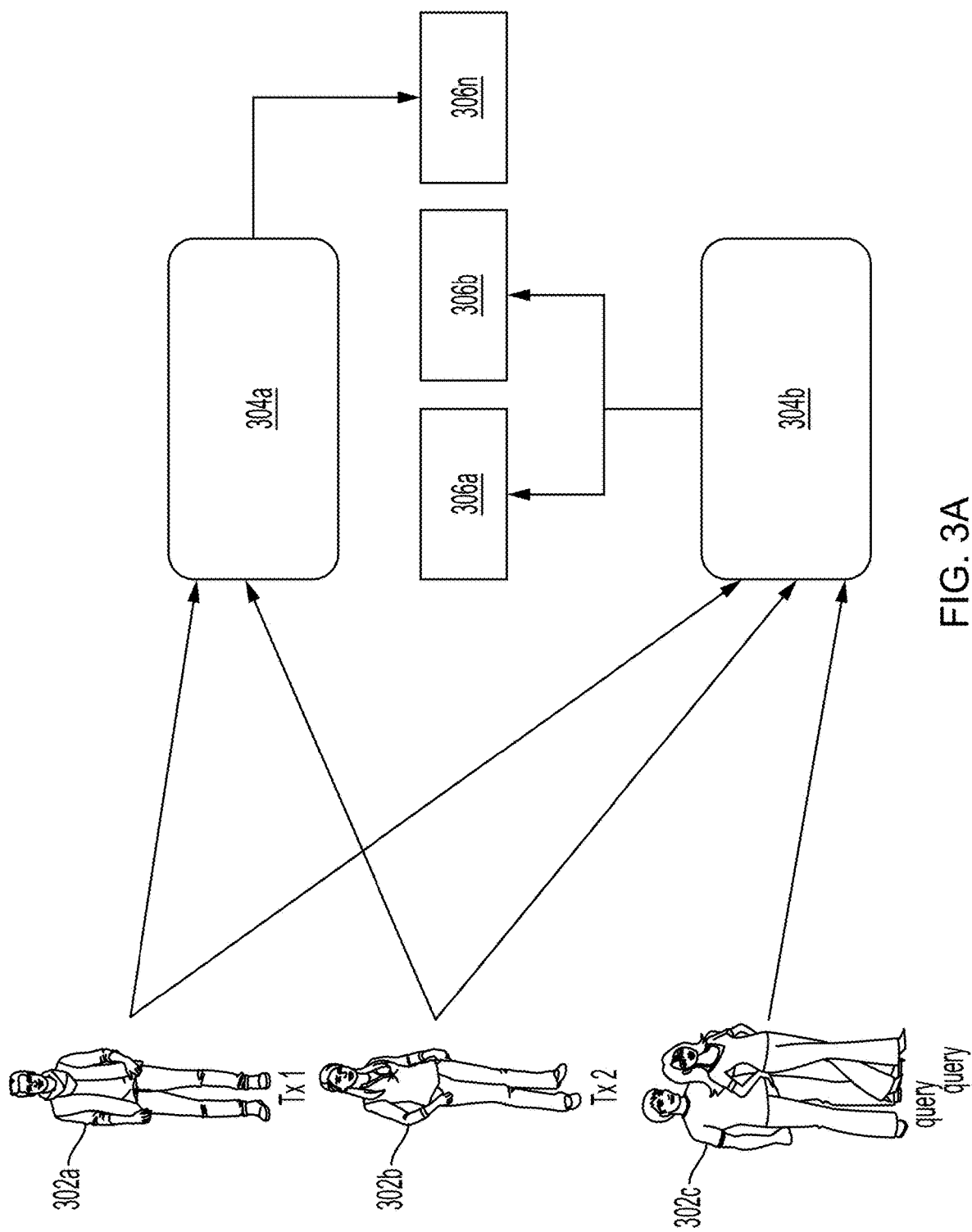
FIGS. 3A and 3B show a first plurality of users submitting computing operation requests including read/write queries to the disclosed database according to some embodiments of this disclosure.
Figure 3B:
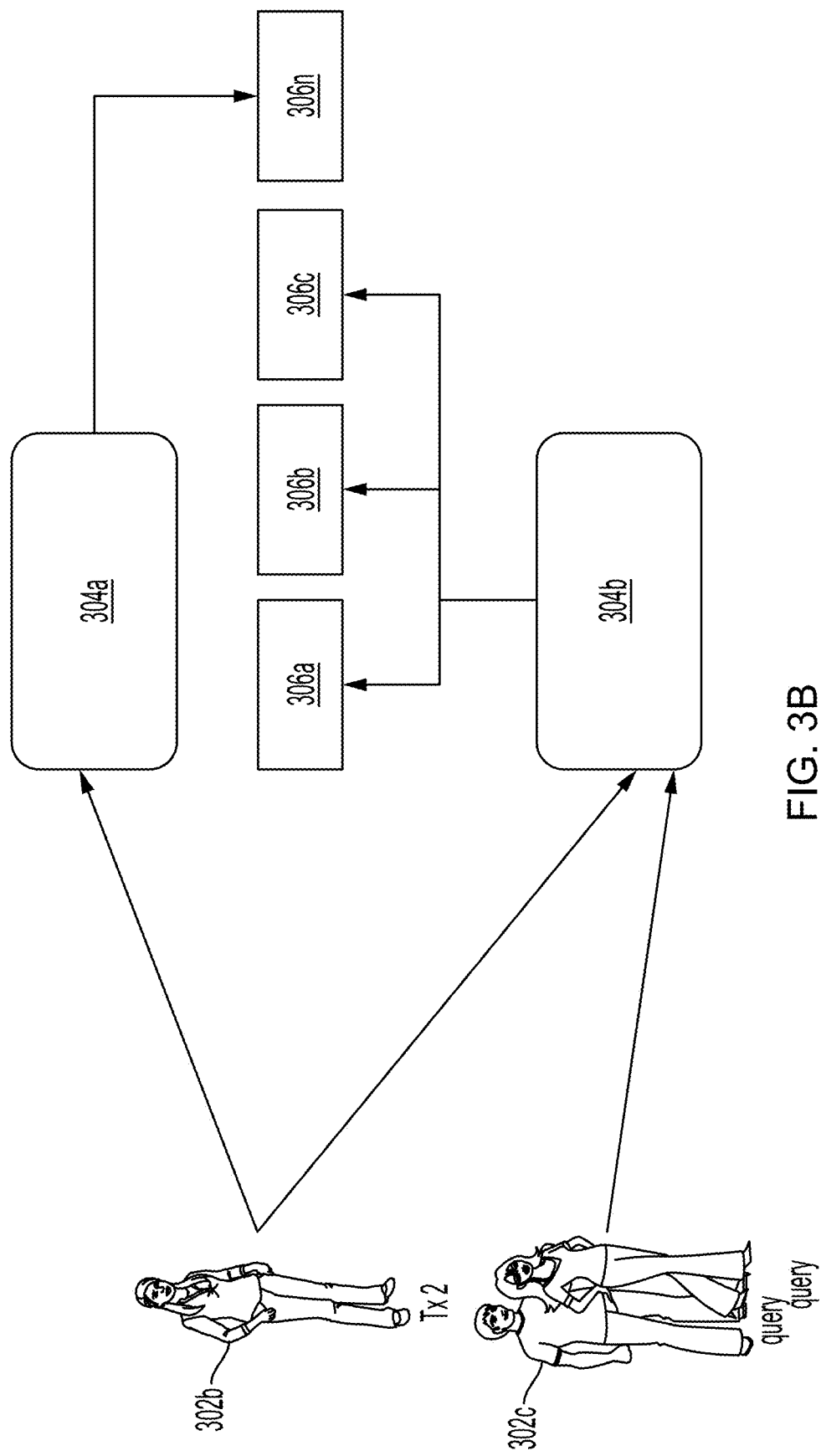

FIGS. 3A and 3B show a first plurality of users 302a . . . 302c submitting computing operation requests including read/write queries to the disclosed database. In FIG. 3A, users 302a and 302b may both be submitting write requests via the database sub-system 304a and simultaneously submitting read requests to the database via the database sub-system 304b which can read specific data segments 306a and 306b. It is appreciated that the write requests may modify or otherwise update or add to data elements comprised in the data segment 306n of the database.

FIG. 3B is generated in response to the first user executing a commit computing operation in association with the write request via the database sub-system 304a to modify or otherwise update first data comprised in a data segment of the database. In particular, users 302c may access the first data written to the segment in question prior to user 302b submitting a commit computing operation associated with the first data. This results in a dirty read computing operation by users 302c because the first data is subsequently being operated on by user 302b during the read operation by users 302c.

Figure 4B:
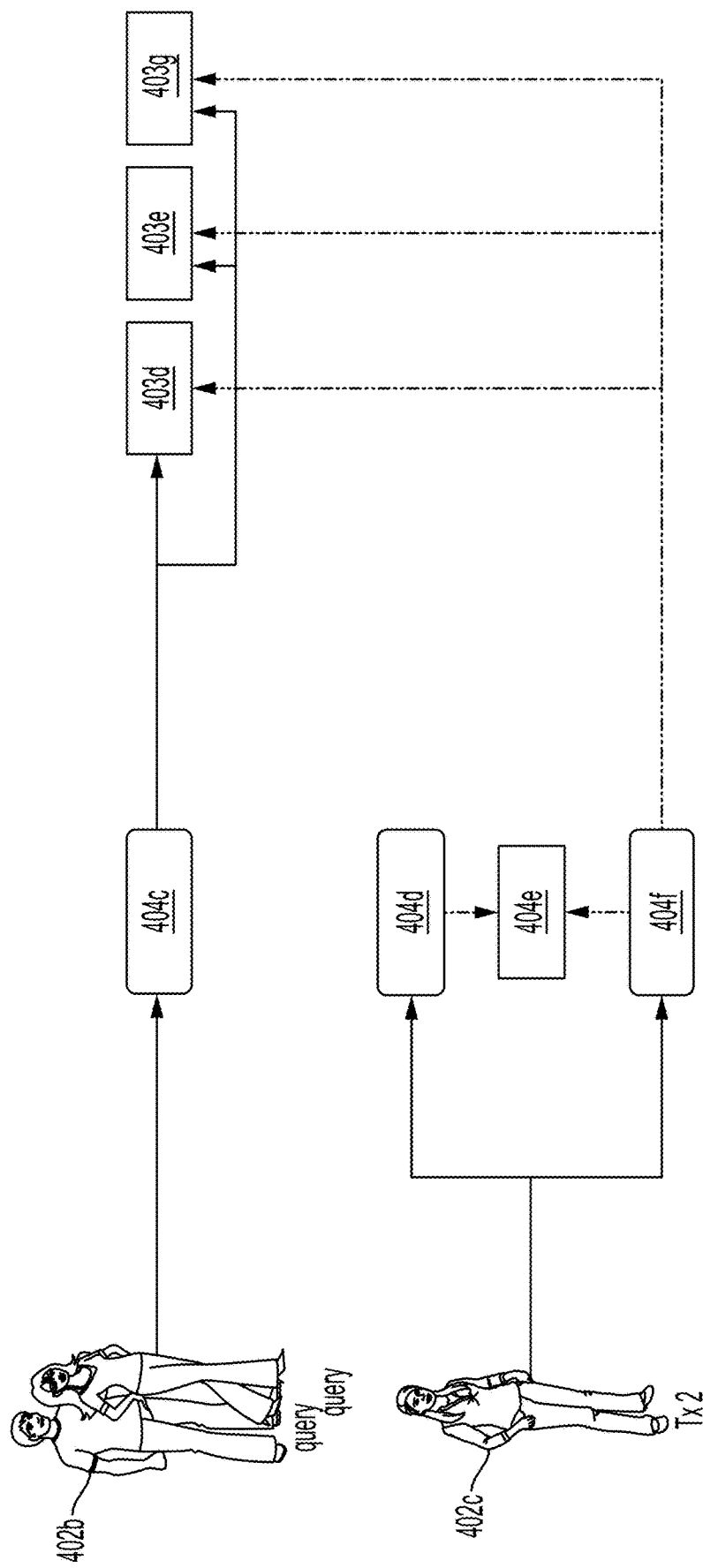

FIGS. 4A and 4B show a second plurality of users 402a . . . 402c submitting computing operation requests including read/write queries to the disclosed database. In the implementations shown in these embodiments, a first data storage structure 403a . . . 403n of the database and a second data storage structure 403f is used to isolate the read/write operations by users 402a and 402c, respectively from the data segments 403d and 403e that are accessible (e.g., readable) by all users including users 402b. This beneficially allows users 402a and 402c to modify specific data segments comprised in the database via database sub-systems 404a and 404d without affecting the primary data segments 403d and 403e accessible to users 402b. This advantageously allows user 402a to execute a commit computing operation (e.g., a data update) on a second data segment (e.g., 403g) of the database following which user 402c can subsequently execute a second commit computing operation on the second data segment without introducing data inconsistencies into the database as indicated in FIG. 4B.

Figure 5A:
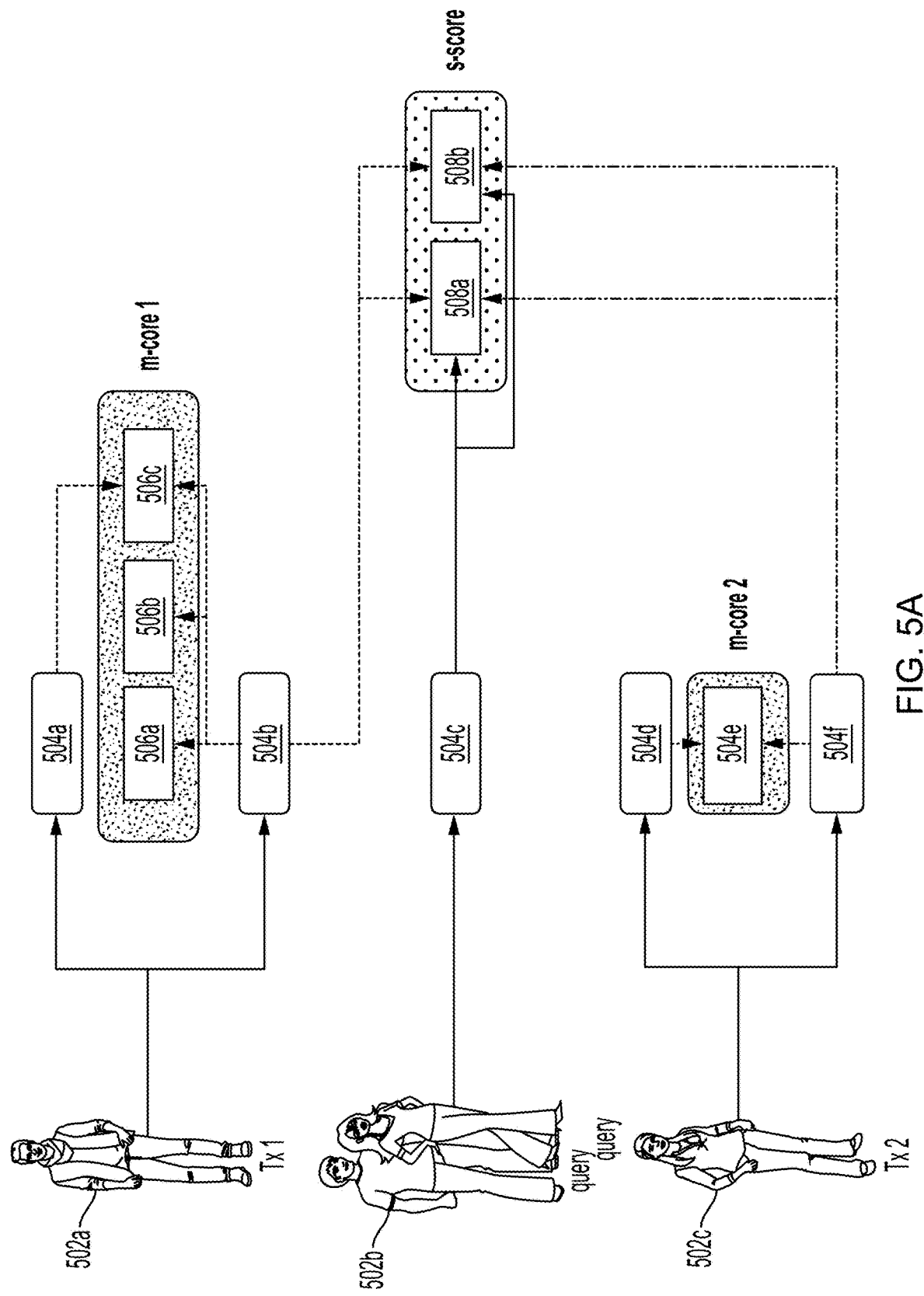

FIGS. 5A, 5B, and 5C show a third plurality of users 502a . . . 502c submitting computing operation requests including read/write queries to the disclosed database including a source of truth database, a first computing storage structure (e.g., s-core), and a second computing storage structure (e.g., t-core). In FIG. 5A, a third data storage structure comprising data segments 506a . . . 506c (e.g., m-core 1) may isolate computing operations including write operations via database sub-system 504a and read operations via database sub-system 504b from similar or dissimilar segments 508a and 508b (e.g., s-core) which are accessible by users 502b and 502c via database sub-systems 504c and 504f. User 502c may similarly have a fourth data storage structure comprising data segment 504e (e.g., m-core 2) which functions similarly relative to m-core 1 and which can be operated on via database sub-system 504d. It is appreciated that m-core 1 and m-core 2 may be dynamically expandable or contractable based on request amount data or request volume data or request frequency data associated with requests (e.g., read/write queries) from users 502a and 502c. It is further appreciated that m-core 1 and m-core 2 may comprise short-lived private indices while the s-core may comprise a snapshot of a substantially large index comprised in the database.

In FIG. 5B, the user 502a executes a commit computing operation that updates data segments of the database such that the updated data segments are dynamically stored in a fifth data storage structure comprising at least data segment 508c (e.g., t-core) which is accessible by users 502b and 502c such that user 502c can directly execute commit computing operations on the data segment 508c that results in updates to data comprised in the data segment 508c. It is appreciated that the t-core comprises a snapshot of recent data additions, data deletions that is visible to at least one application of the database.

In FIG. 5C, once user 502c executes a commit computing operation associated with one or more data segments 508c and 508d, users 502b may be able to access the contents of the t-core as shown. It is appreciated that the t-core can be dynamically expanded or contracted based on request amount data or request volume data or request frequency data associated with users 502a, 502c, or 502b.

Figure 6B:
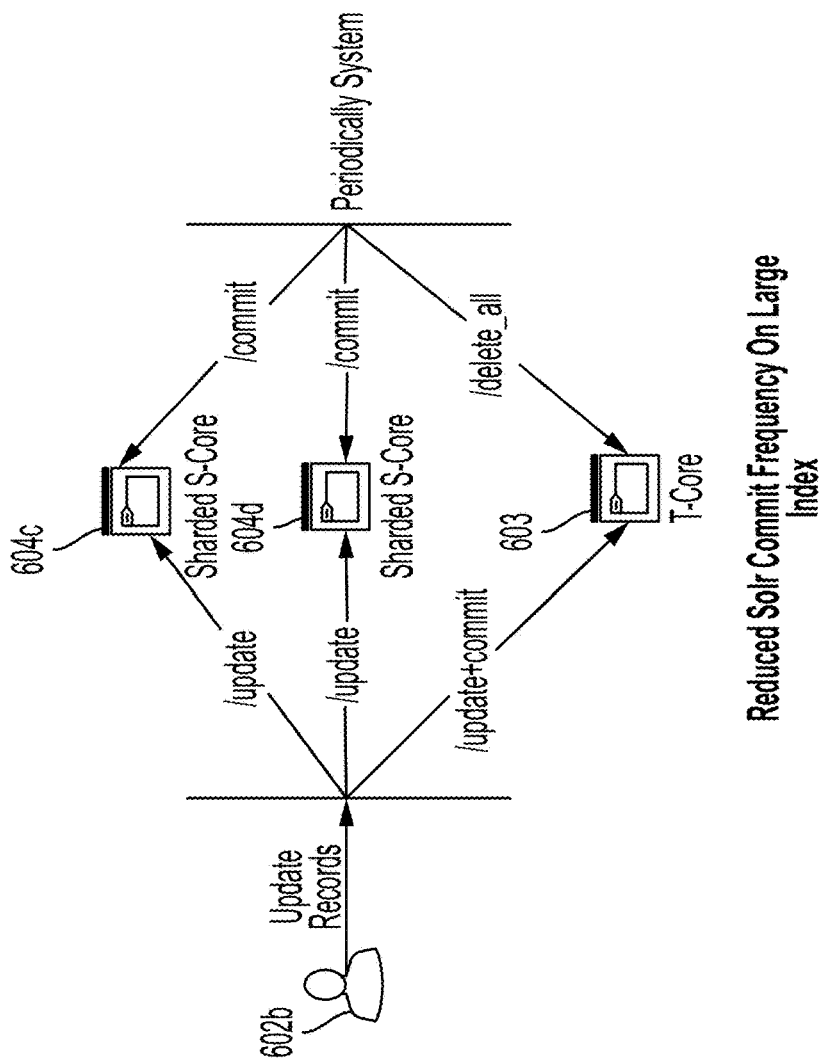
FIG. 6B shows a second implementation where a majority of the commit computing operations and/or other data update computing operations are executed on a t-core data storage structure of the database instead of directly on the sharded cores according to some embodiments of this disclosure.
Figure 6A:
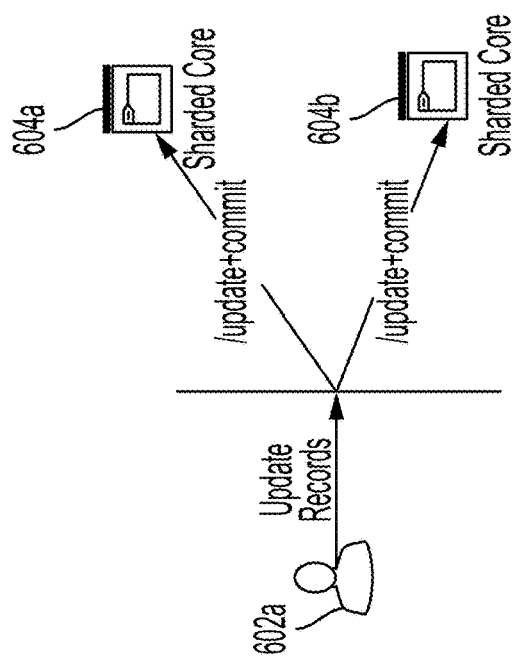
FIG. 6A shows a first implementation where commit computing operations and/or other data update computing operations are directly executed on sharded cores or sections of the disclosed database according to some embodiments of this disclosure.

FIG. 6A shows an implementation where commit computing operations and/or other data update computing operations are directly executed on sharded cores or sections 604a and 604b of the database. This implementation results in performance issues which can be addressed by the disclosed methods and systems as indicated in FIG. 6B.

In FIG. 6B, frequency of commit computing operations and/or other data update computing operations on the s-core or the sharded s-core (e.g., a first data storage structure) of the database are minimized by implementing a t-core 603 (e.g., a second data storage structure) of the database such that the t-core 603 comprises: new or updated data elements relative to the s-core shards 604c and 604d; or a subset of the data elements comprised in the s-core.

FIG. 7 shows a table indicating performance data for implementations associated with FIG. 6B. As seen in the figure, user requests comprising computing operations including commit computing operations for s-cores 702a and 702b can comprise over 1500 record additions requests or file addition requests or index addition requests 704a with associated commit times of 7968.21 seconds and 24753.7 seconds, respectively, for s-cores 702a and 702b. With the introduction of t-cores 703a and 703b, the number of updates 704b are still over 15000 however, the commit times 706b are substantially reduced relative to the commit times 706a without the t-cores 703a and 703b. This emphasizes the benefits of implementing the disclosed secure database with two or more data storage structures (e.g., t-cores and s-cores).

Exemplary Flowchart

FIG. 8 shows an exemplary flowchart for improving query performance for a secure storage system. It is appreciated that a data engine or one or more data engines stored in a memory device may cause a computer processor to execute the various processing stages of FIG. 8. It is further appreciated that the various processing stages of FIG. 8 may be implemented in one or more software applications to, for example, optimally speed up or beneficially facilitate rapid execution of computing operations associated with the secure storage system. For example, the disclosed techniques can be implemented to advantageously enable: rapidly executing commit computing operations associated with the secure storage system without decreasing computation performance of the secure storage system; rapidly identifying and retrieving files or records associated with the secure storage system; independently isolating computing operations from a plurality of users accessing data comprised in the secure storage system to facilitate version control of data within the secure database; and ensuring that data updates within the secure storage system do not result in data inconsistencies or update conflicts from the plurality of users.

Turning to block 802 of FIG. 8, the data engine determines a first data store for the secure storage system. The first data store, for example, comprises a first plurality of indices having a first size and stored within a first computing storage structure associated with the secure storage system. At block 804, the data engine determines, based on a first computing operation associated with the first data store, a second data store for the secure storage system. According to one embodiment, the second data store comprises a second plurality of indices having a second size that is smaller relative to the first size of the first data store. Furthermore, the second data store is stored within a second computing storage structure associated with the secure storage system and comprises one of: new data that is absent from the first data store; or second data that is a subset of first data comprised in the first data store.

At block 806, the data engine receives a first computing command configured to implement one or more of: a data update computing operation on one or more of the first data or the second data; or a data deletion computing operation on one or more of the first data or the second data.

At block 808, the data engine executes a prioritization computing operation, based on the first computing command, associated with the first data of the first data store or the second data of the second data store following which the data engine executes, at block 810 and based on the prioritization computing operation, the first computing command on at least one data element comprised in the second data of the second data store and thereby generate and store an updated set of data elements within the second data store.

Turning to block 812, the data engine initiates a deduplication computing operation by selectively marking, based on the updated set of data elements of the second data store, corresponding set of data elements within the first data store. In addition, the data engine merges, at block 814, based on the selectively marking, the updated set of data elements within the second data store with the corresponding set of data elements within the first data store.

These and other implementations may each optionally include one or more of the following features.

The first data store or the second data store comprises an inverted storage index associated with a record or a file such that search terms associated with a computing input to the secure storage system is mapped to the record or the file using at least one of the first data store or the second data store.

Furthermore, the merging comprises: searching the first data of the first data store and the second data of the second data store to generate search data; generating, based on the search data, identifier data comprising a document identifier list associated with the selectively marking of the corresponding set of data elements within the first data store; deleting or removing, during a data maintenance stage of the first data store, the corresponding set of data elements within the first data store based on the identifier data; and in response to deleting the corresponding set of data elements within the first data store based on the identifier data, merging the updated set of data elements within the second data store with data elements of the first data store. According to some embodiments, the merging occurs prior to deleting the corresponding set of data elements within the first data store.

In response to receiving a second computing command associated with new data, the method of FIG. 8 further comprises: determining that the new data is absent from the first data store and the second data store; creating a data record of the new data in a source of truth database associated with the secure storage system; loading, from the source of truth database, at least index data associated with the data record into the second data store; and executing the second computing command based on at least the index data associated with the data record in the second data store and thereby generate updated new data.

In addition, the method comprises: dynamically merging data elements of the second data store including the updated new data with data elements of the first data store, at a first execution time, in response to executing at least one computing operation associated with the second computing command on the data elements of the second data store; and deleting the data elements of the second data store in response to the merging, at a second execution time, during which a data maintenance computing operation is executed on the first data store. It is appreciated that a management computing sub-system associated with the secure storage system coordinates data operations among the first data store and the second data store.

According to one embodiment, the second size of the second data store can be contracted or expanded based on one or more of: operations comprised in the first computing command or the second computing command; and frequency of executing one or more of the first computing command, the second computing command, or a third computing command.

In some cases, the first computing command or the second computing command is associated with at least one of: creating a data record for storage in a source of truth database associated with the secure storage system; reading the data record stored in the source of truth database associated with the secure storage system into the second data store; updating the read data record in the second data store and thereby generate an updated data record; and temporarily storing the updated data record in the first data store.

Moreover, the first computing command is a first commit computing command that saves changes made to the second data on the second data store.

In exemplary embodiments, the second data store is configured to rapidly execute a plurality of computing commands comprising a plurality of commit computing commands including the first commit computing command associated with the secure storage system thereby preventing directly overloading the first data store with the plurality of computing commands. Furthermore, the first commit computing command can be based on a transaction control language associated with the secure storage system, according to some embodiments.

In some cases, one or more of the deduplication computing operation or the merging is executed in real-time or intermittently among a first time and a second time. For example, the first time and the second time could be separated by about at least 5 seconds or at least 10 seconds, or by at least 30 seconds, or by at least 5 minutes, or by at least 10 minutes, or by at least half a day, or by at least 1 day.

In some implementations, the second data store isolates the second data of the second data store from the first data of the first data store from being directly operated upon by the first computing command.

It is appreciated that the first data store and the second data store are comprised in a data storage system associated with the secure storage system including the first computing storage structure and the second computing storage structure.

Moreover, the secure storage system comprises a plurality of shards, wherein: a first shard comprised in the plurality of shards is the first data store; and a second shard comprised in the plurality of shards comprises a third data store has a third size. It is appreciated that: the size of the third data store is larger than the second size of the second data store; and new or updated data in the second data store is merged with data elements of the third data store. In addition, the plurality of shards are computationally isolated from being directly operated on by a plurality of computing commands associated with the secure storage system such that the plurality of computing commands are executed on data elements comprised in the second data store.

It is appreciated that the secure storage system comprises the source of truth database, the first data store, and the second data store. In some embodiments, the first data store may also be referred as an s-core. Both terms may be used interchangeably. Similarly, the second data store may be referred to as a t-core according to some embodiments. Both terms (e.g., second data store and t-core) may be used interchangeably. It should be noted that the source of truth database, the first data store, and the second data store are separate or otherwise distinct relative to each other according to some embodiments.

According to one embodiment, the first computing command comprises a search parameter associated with a file or record associated with the secure storage system. In response to executing the first computing command and based on the updated set of data elements, initiating generation of a visualization on a graphical display that indicates the file or the record.

In some implementations, data comprised in the first data store or the second data store indicate a denormalized copy of data comprised in a source of truth database associated with the secure storage system. Furthermore, a document or a file comprised in the source of truth database is represented as data record elements spread across two or more computing storage structures (e.g., data tables) of the source of truth database. In addition, the foregoing denormalized copy of data can comprise a record indicating a consolidation (e.g., combination or aggregation a plurality of data element sets) of the data record elements spread across the two or more computing storage structures mentioned above. In response to executing a final commit computing operation on the first data store during a data maintenance computing operation, the method of FIG. 8 further comprises storing the data elements in the first data store within the source of truth database. It is appreciated that the first data store and the second data store enable rapidly executing queries on data comprised in the source of truth database associated with the secure storage system.

Additional Workflows

Figure 9A:
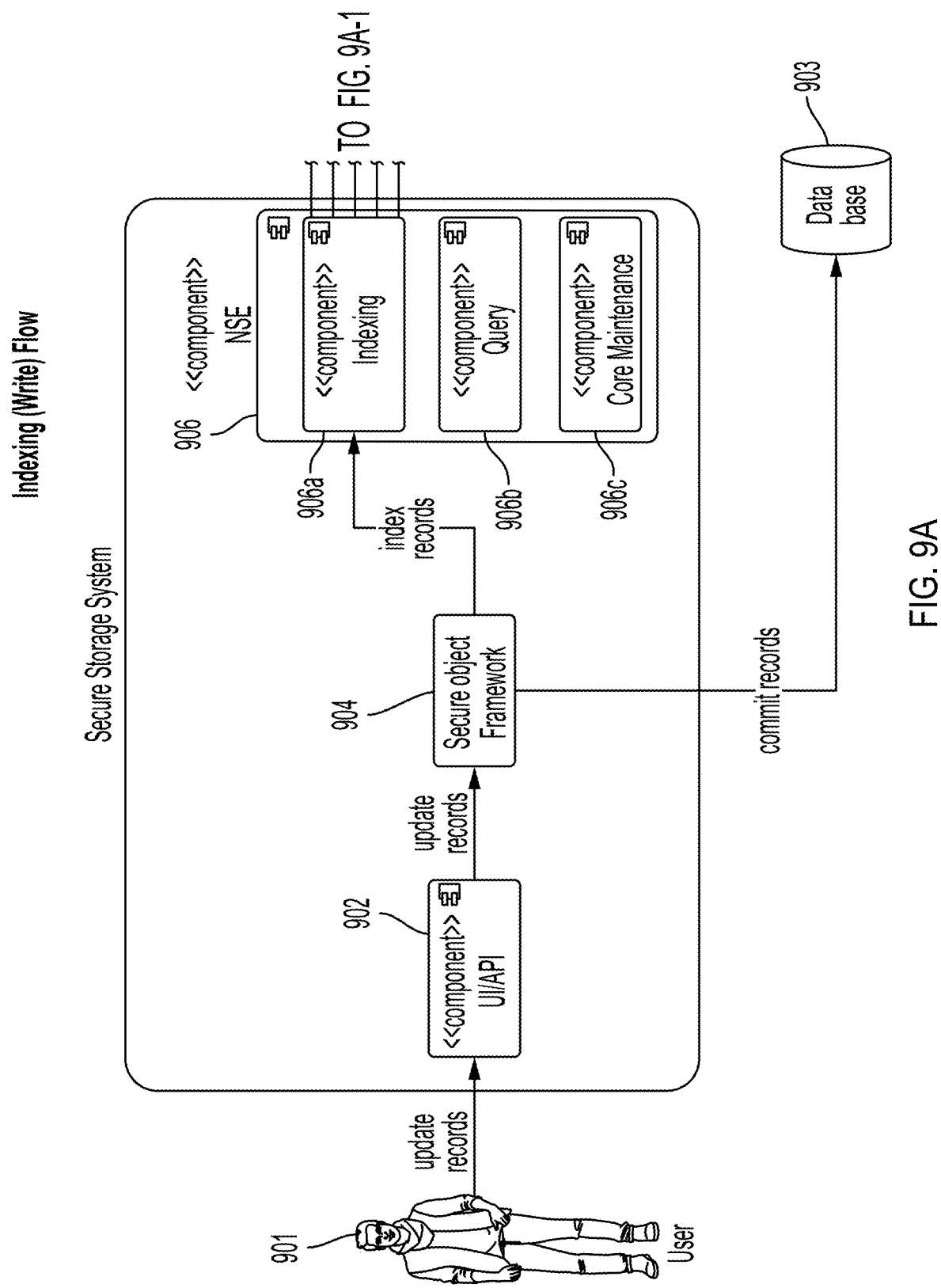
FIGS. 9A-9C-1 show additional exemplary workflows associated with the disclosed secure storage system according to some embodiments.
Figures 1, 9A:
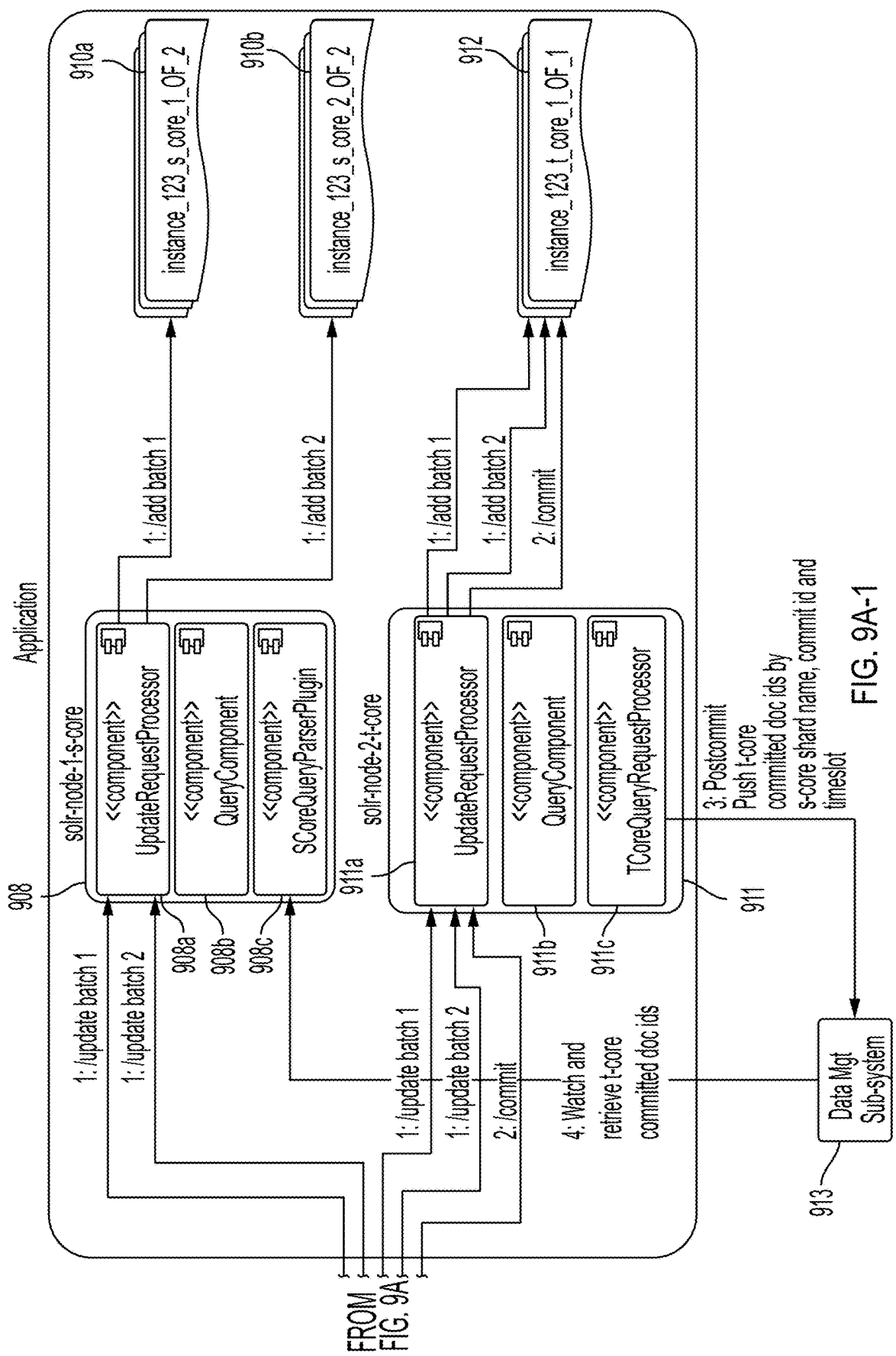

FIGS. 9 and 9A-1 in combination show an exemplary workflow for executing an indexing operation associated with the disclosed computing storage system. As seen in these figures, a user 901 submits a computing command via a user interface or and application programming interface (API) 902 to an application associated with the secure storage system. The computing command is analyzed or otherwise processed as a request associated with a secure object framework using the framework sub-system 904. According to one embodiment, the framework sub-system may directly execute a computing operation such as a commit computing operation on data comprised in a source of truth database 903 based on the received computing command.

In some embodiments, the framework sub-system 904 may initiate, based on the received input command, an indexing operation 906a on data associated with the source of truth database 903 or the computing data structures 908 and 911 as further discussed below. It is appreciated that the component sub-system 906 can be used to: execute queries 906 associated the first computing command or a second computing command; and execute a data maintenance (e.g., core maintenance) computing operation.

With regard to executing indexing computing commands 906a, one or more data update computing operations may be communicated to an update request processor 908a associated with the first computing storage structure 908. The update request may also be simultaneously transmitted to an update request processor 911a associated with the second computing storage structure. It is appreciated that the first computing storage structure 908 may have associated sub-systems including a first query component sub-system 908a and query parser sub-system 908c. Similarly, the second computing storage structure 911 may have a second component sub-system 908 together with a query processor sub-system 911c. The various sub-systems associated with the first and second computing storage structures are adapted to execute one or more computing operations associated with a computing input or a computing command submitted to the secure storage system.

According to one embodiment, a data management computing sub-system or a "zookeper" sub-system 913 of the secure storage system coordinate or otherwise manages data communications or data transmissions among the first and second computing storage structures 908 and 911 in order to implement computing operations comprised in a received computing command.

It can be seen that during the implementation of the indexing computing operation, update operations may be implemented on data comprised in both the first and second computing storage structures 908a and 911 as reflected in the updates to indices 9110a, 910b, and 912 It should be noted in this indexing workflow that commit computing operations and/or data merging computing operations are implemented in on data associated with the second computing storage structure 911 dynamically (e.g., in real-time or near real-time when executing a computing command) while commit computing operations are executed on data elements of the first computing storage structure 908 during data maintenance (e.g., core maintenance) computing operation times or periods which can be parameterized or otherwise configured based on data demands of the secure storage system.

Figure 9B:
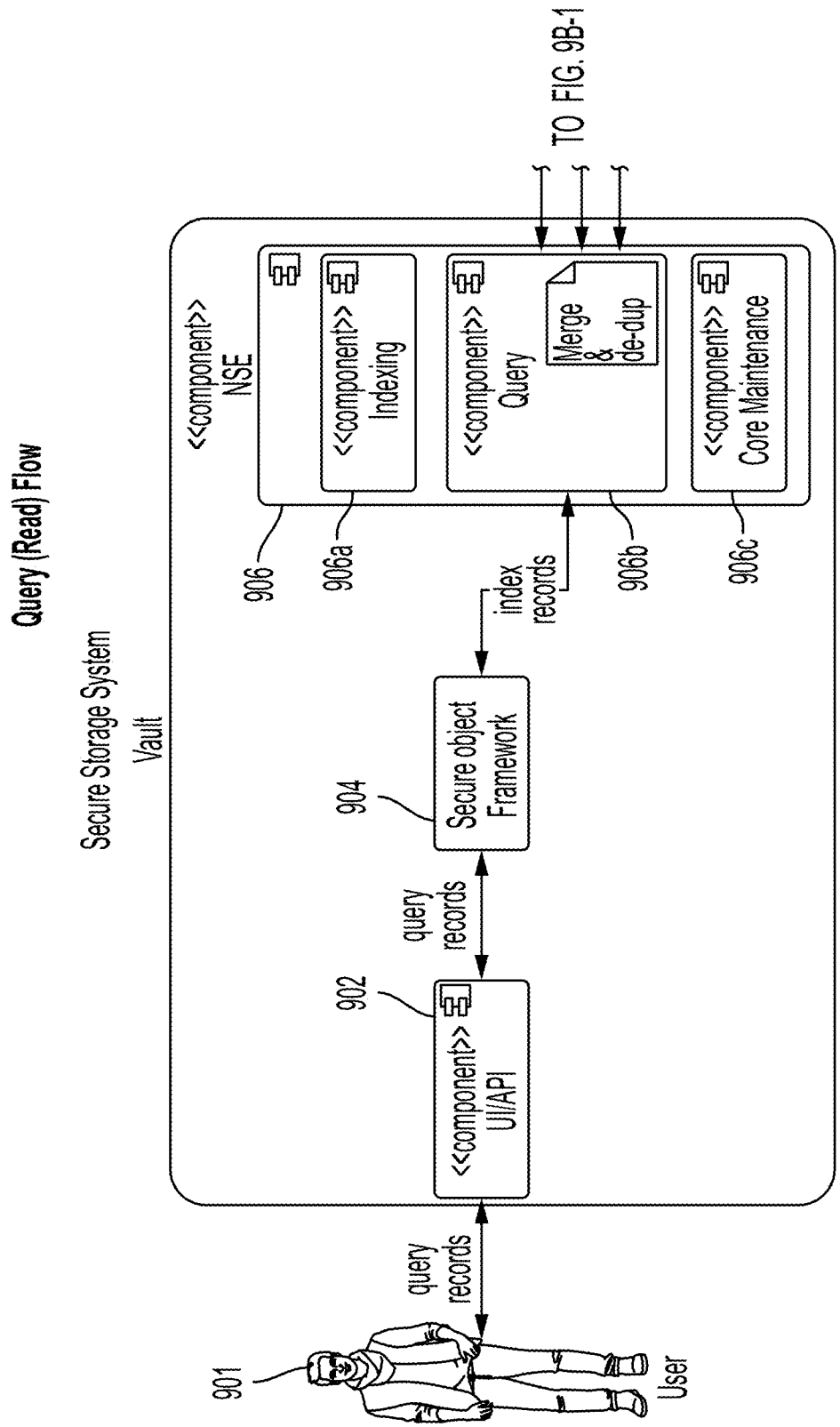
Figures 1, 9B:
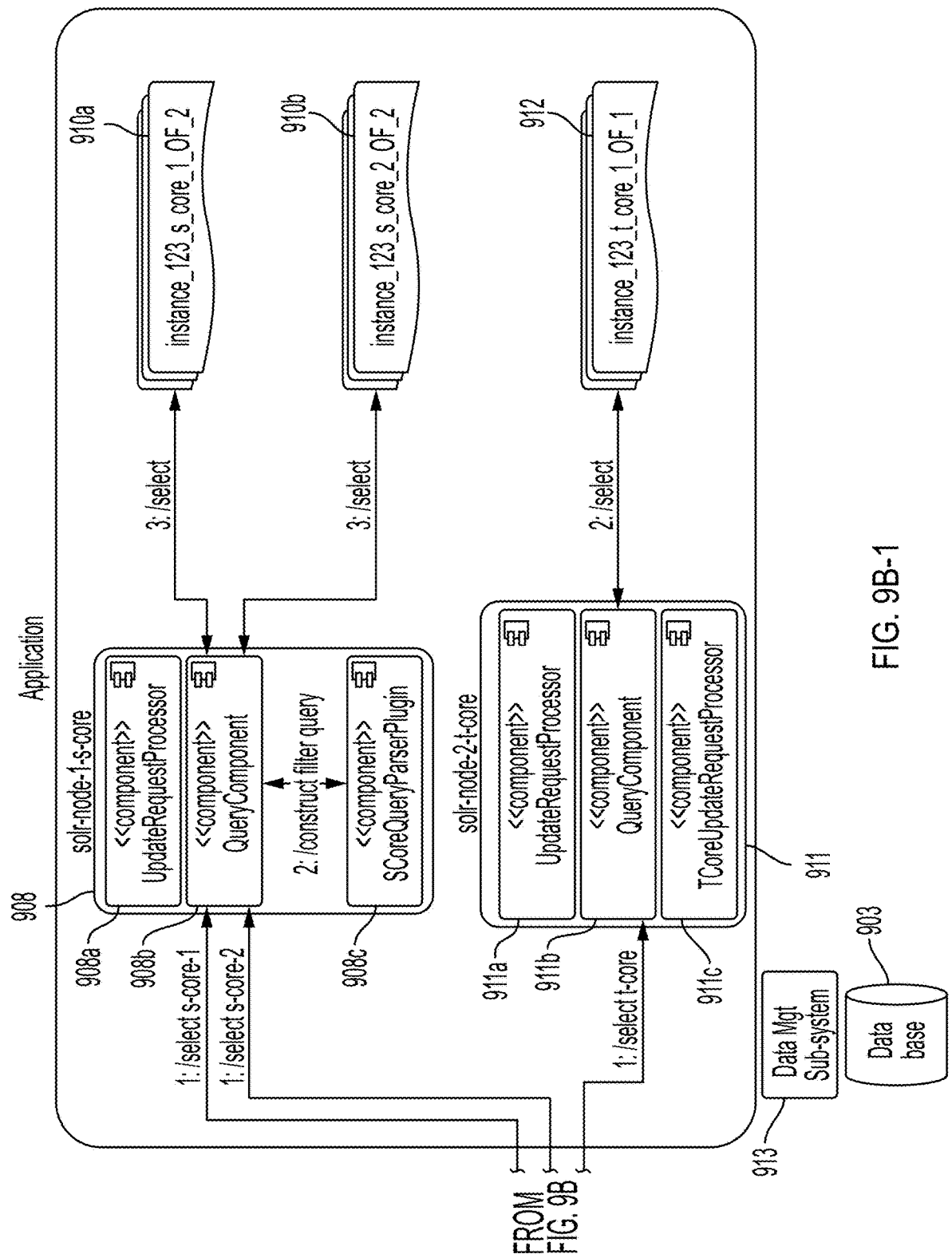

In FIGS. 9B and 9B-1, the computing command comprises a workflow for reading data associated with the secure storage system. In these figures, a query 906b associated with a received computing command may be used retrieve data (e.g., index 912) from the second computing data structure 911 and/or retrieve data (e.g., indices 910a and/or 910b) from the first computing data structure 908.

Figure 9C:
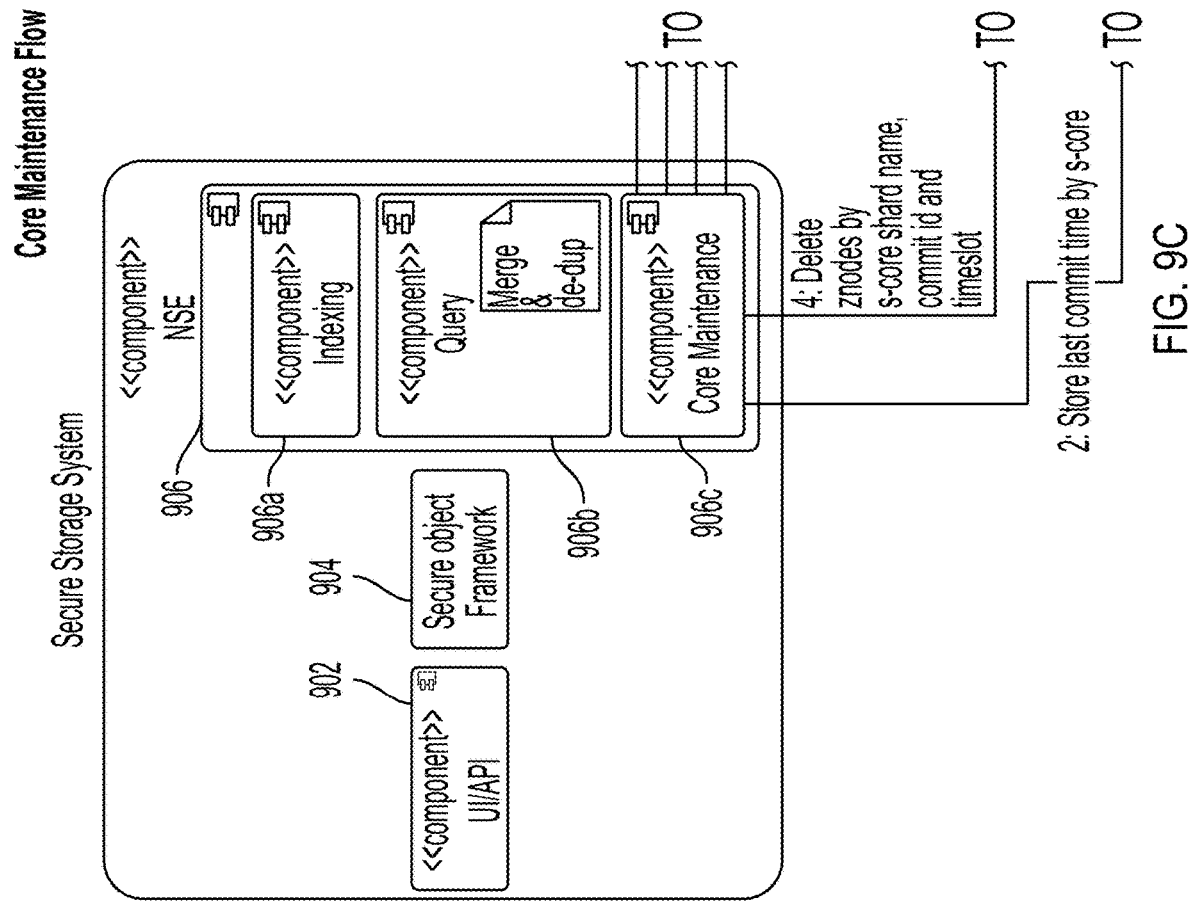
Figures 1, 9C:
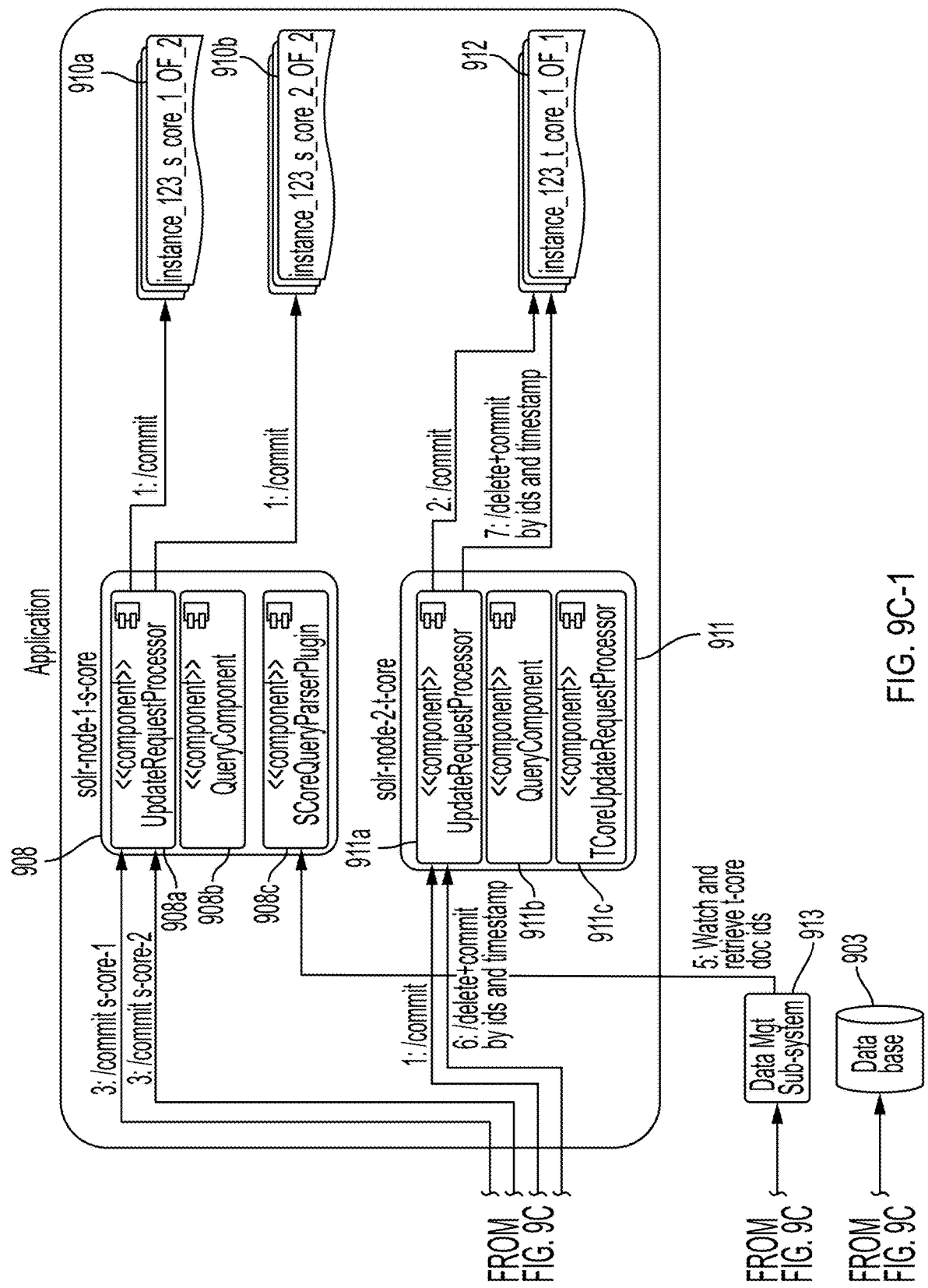

FIGS. 9C and 9C-1, a data maintenance computing operation or a core-maintenance computing operation is executed on data comprised in, or associated with the first computing storage structure 908. In particular, this figure indicates that while a plurality of commit computing operations may be implemented on data or indices associated with the second computing storage structure 911 at any time during the execution of a computing command, this is not the case with the first computing storage structure. This is because implementing commit computing storage operations directly on the first computing storage structure 908 leads to expensive computational costs. As such commit operations are executed on the first computing storage structure 908 during the data maintenance computing operations according to some embodiments. In addition, revised or updated data operated on and stored int the first computing storage structure 908 during a final computing operation associated with the data computing operations are stored in the source of truth database 903 as shown in the figure.

Additional Embodiments

Figure 10A:
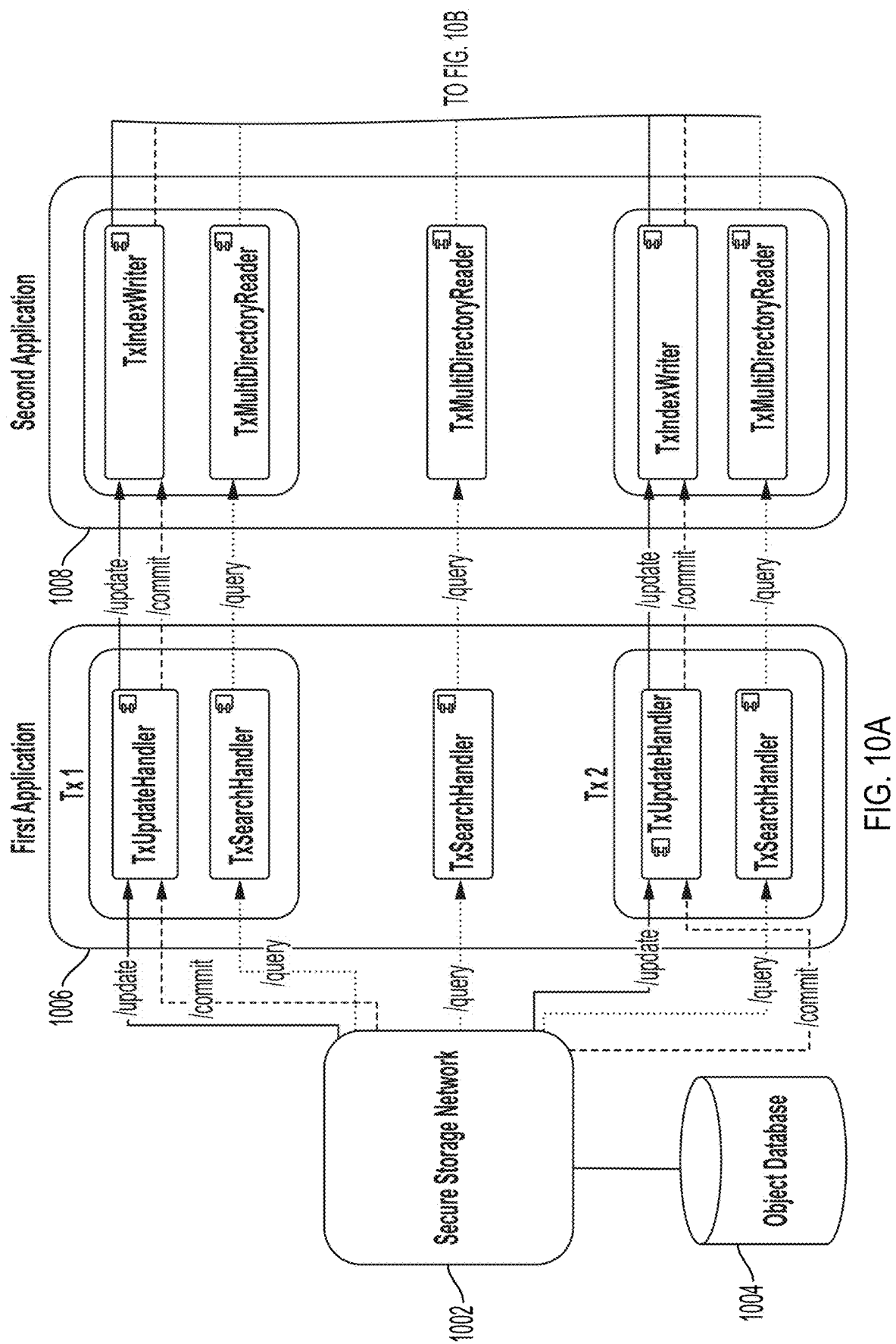
FIGS. 10A-10B show an exemplary interconnection of an object database, a first application, and a second application to form a secure storage network.
Figure 10B:
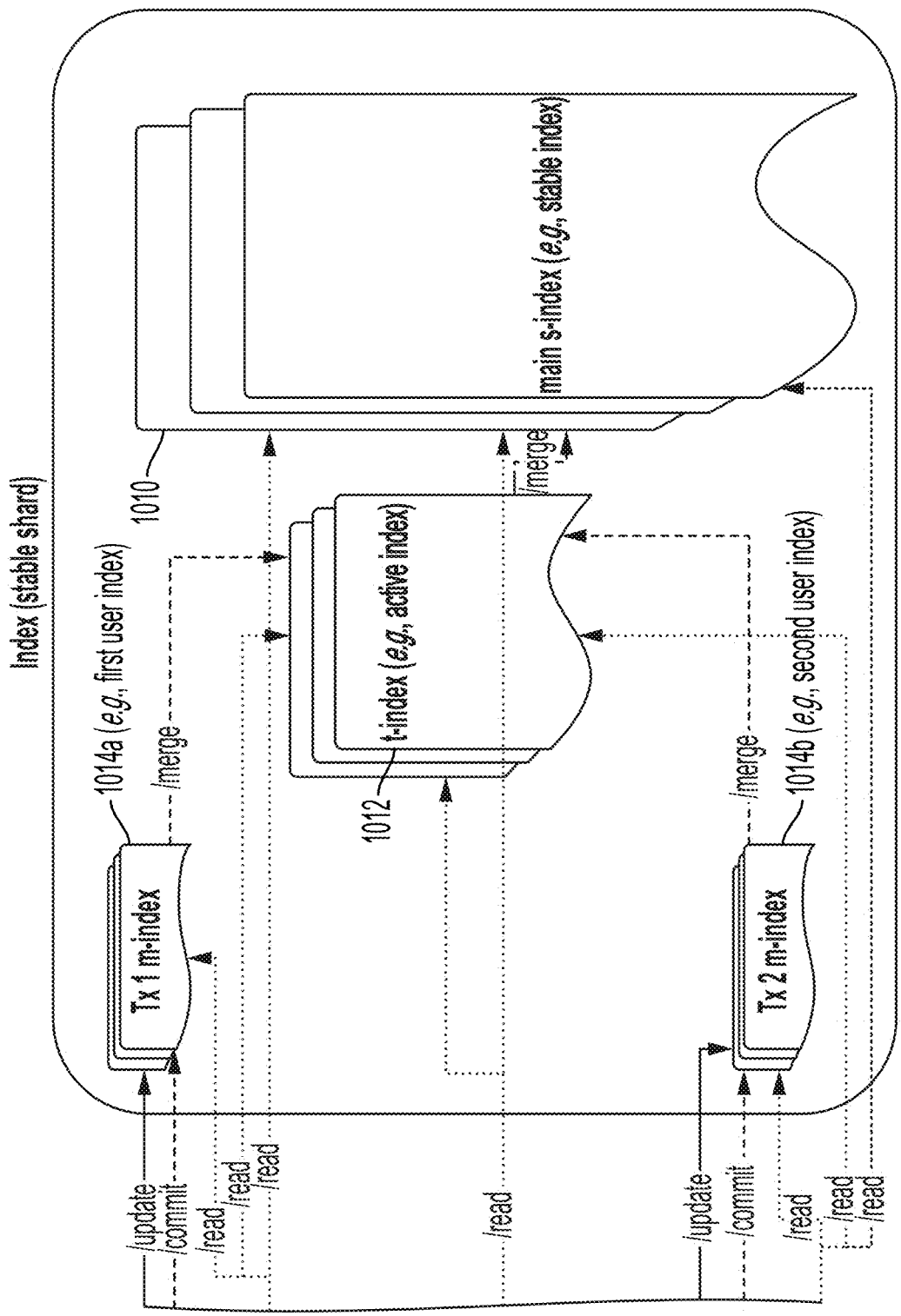

FIGS. 10A-10B show an exemplary interconnection of an object database, a first application, and a second application to form a secure storage network. As seen in this figure, the secure storage network 1002 can be configured to establish a data communication channel or a data communication link between the object database 1004, the first application 1006, and the second application 108.

According to one embodiment, the object database 1004 is configured to store data objects including documents or records similar to those discussed under the exemplary embodiments section of this disclosure. In some cases, the stored data objects within the object database 1004 comprise file data objects, document data objects, image data objects, textual data objects, audio data objects, etc.

In one embodiment, the first application 1006 and/or the second application 1008 may comprise one or more software or firmware configured to: enable data communication to, or from, the object database; and/or enable data access to, or from, the object database; and/or enable data structuring within the object database 1004 as the case may require.

As seen in the figure, the first application 1006 and/or the second application 1008 may beneficially facilitate data read computing operations within the secure storage network 1002, data update computing operations within the secure storage network 1002, data write or data update computing operations within the secure storage network 1002; and/or data commit computing operations; and/or data merger computing operations. According to one embodiment, one or more primary data stores 1010 (e.g., a main index also referred to as a stable index data store), one or more secondary data stores 1012 (e.g., also referred to as an active index), and one or more tertiary data stores 1014 (e.g., tertiary data stores 1014a and 1014b also referred to as user indices) may be activated based on the communicative coupling of the object database 1004, the first application 1006, and the second application 1008. The one or more primary data stores 1010, the one or more secondary data stores 1012, and the one or more tertiary data stores 1014 may be configured to store index data (e.g., inverted indices). In addition, data indices stored in the one or more tertiary data stores 1014 is a subset of the data indices stored in the one or more secondary data stores 1012. Similarly, data indices stored in the one or more secondary data stores 1012 constitute a subset of the data indices stored in the one or more primary data stores 1010.

As can be seen in FIGS. 10A-10B, a first query (e.g., based on an input command or a user input) within the secure storage network may be computationally isolated for execution within a first tertiary data store 1014a from a second query which is executed within a second tertiary data store 1014b. The first and second queries may also be computationally separated or isolated from a third query (e.g., a read query) which is directly executed on a first secondary data store within the one or more secondary data stores 1012. One benefit of separating the various queries within the secure storage network 1002 as depicted is that this speeds up execution of multiple queries from multiple similar or dissimilar digital accounts associated with the secure storage network 1002. Another benefit of the illustrated interconnection of FIG. 10 is that a given query (e.g., a read query) such as the third query is advantageously implemented to act on completely processed data and not data undergoing processing based on, for example, the first and second queries referenced above.

Figure 11A:
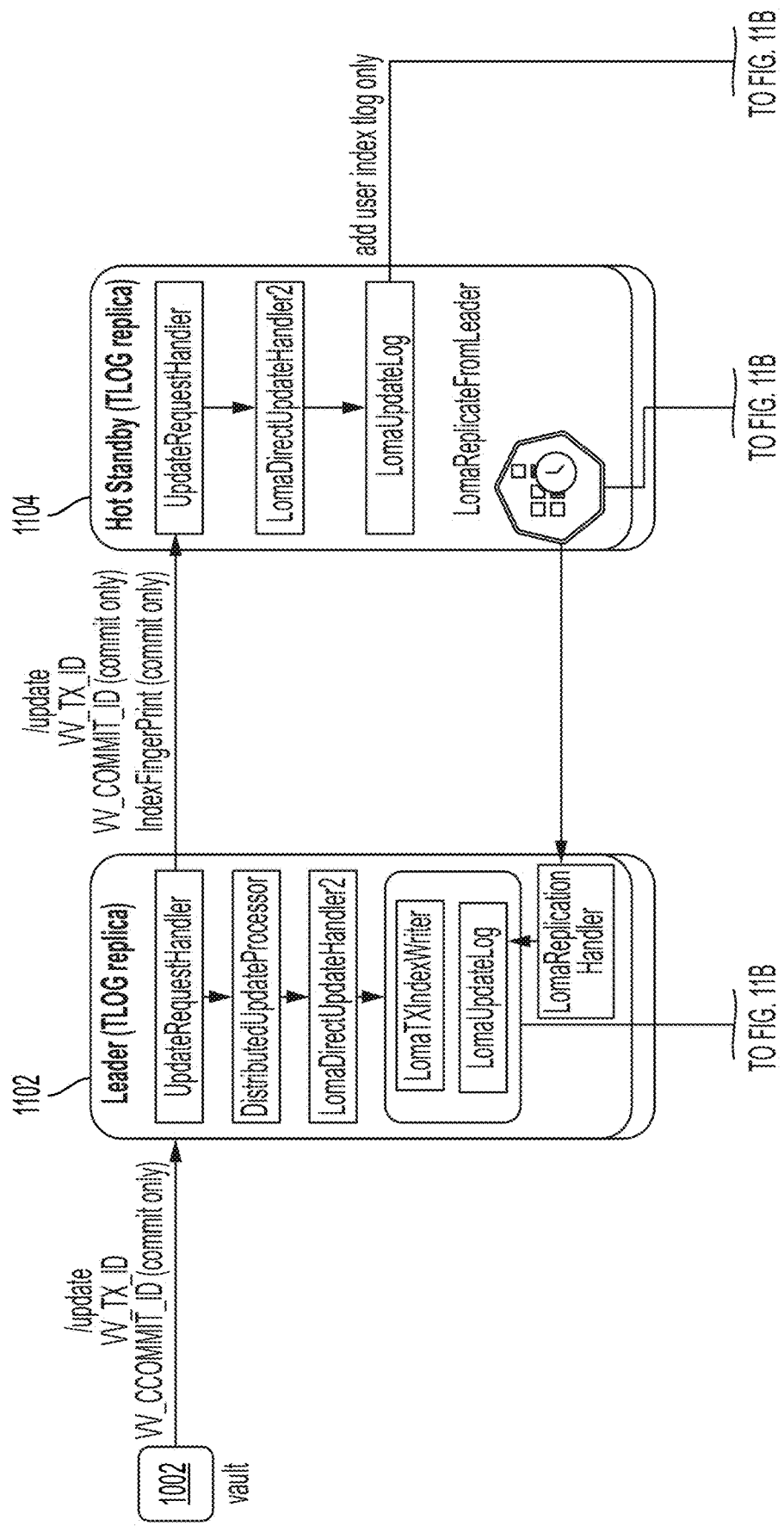

FIGS. 11A-11B show an exemplary leveraging of log files to maintain data consistency within the object data base 1004 referenced in association with FIGS. 10A-10B. In particular, the first application 1006 can be is configured to generate a first log file 1102 for determining or tracking computing operations occurring in one or more of tertiary data stores 1014 and/or one or more secondary data stores 1012 and/or one or more primary data stores 1010. In addition to the first log file 1102, the secure storage network 1104 adaptively generates a second log file 1104 for detecting or recording data events or data interactions among the first application 1006, the second application 1008, and the object database 1004 (e.g., 1004a and 1004b). It is appreciated that the first log file 1102 and the second log 1104 file can be applied by the secure storage system 1002, to maintain data consistency and/or data accuracy within at least the object database 1004 of the secure storage network 1002.

First Additional Exemplary Workflow

FIG. 12 shows an exemplary workflow for controlling and speeding up data access in a secure storage network. It is appreciated that one or more data engines stored in a memory device may cause a computer processor to execute the various processing stages of the workflow of FIG. 12. For example, the disclosed techniques may be implemented as one or more data engines comprised in a secure storage network that are optimized to computing operation isolation and access of data associated with the secure storage network.

At block 1202, the one or more data engines communicatively couple an object database, a first application, and a second application to form the secure storage network. This communicative couple may comprise leveraging computing hardware and/or computing logic to connect, link, or establish a data communication channel among the object database, the first application, and the second application. In one embodiment, the first application may comprise one or more software or firmware configured to enable data communication among the object database, the first application, and the second application within the secure storage network.

Turning to block 1204, the one or more data engines activate, based on the communicatively coupling, a plurality of primary data stores (e.g., stable index data stores) that are configured to store index data corresponding to a plurality of data objects stored in the object database, such that at least one data store of the plurality of primary data stores has a first size. In some cases, each of the plurality of primary data stores have the same size whereas other implementations have different sizes for the plurality of primary data stores. Furthermore, each of the plurality of primary data stores may be configured to store a data index (e.g., an inverted data index).

At block 1206, the one or more data engines also activate, based on the activated plurality of primary data stores: a plurality of secondary data stores (e.g., active indices) that correspond to, and are separate from, the plurality of primary data stores, such that at least one data store of the plurality of secondary data stores has a second size that is smaller than the first size and is configured to store index data; and a plurality of tertiary data stores that correspond to, and are separate from, the plurality of secondary data stores. According to one embodiment, each of the plurality of tertiary data stores has a third size that is smaller than the second size. In addition, the first size or the second size or the third size may be dynamically determined (e.g., logically expanded or contracted) based on: the types of queries received by the secure storage network; the volume of queries received by the secure storage network; available processing power of the secure storage network; types of outputs generated using the secure storage network; etc.

At block 1208, the one or more data engines select: a first primary data store of the plurality of primary data stores; a first secondary data store of the plurality of secondary data stores; a first tertiary data store of the plurality of tertiary data stores; and a second tertiary data store of the plurality of tertiary data stores. In one embodiment, the first and second tertiary data stores correspond to, or are associated with, the first secondary data store. Similarly, the first secondary data store corresponds to, or is associated with the first primary data store.

At block 1210, the one or more data engines load: a first set of data indices into the first primary data store; a second set of data indices corresponding to the first set of data indices into the first secondary data store; a third set of data indices corresponding to the second set of data indices into the first tertiary data store; and the third set of data indices corresponding to the second set of data indices into the second tertiary data store. In one embodiment, the second set of data indices comprise a subset of the first set of data indices. Similarly, the third set of data indices comprise a subset of the second set of data indices.

At block 1212, the one or more data engines modify, based on the first application or the second application: at least one first data element comprised in the third set of data indices within the first tertiary data store to generate a first modified data element; and at least one second data element comprised in the third set of data indices within the second tertiary data store to generate a second modified data element. It is appreciated that modifying the at least one first data element comprised in the third set of data indices within the first tertiary data store is computationally isolated (e.g., computationally independent or computationally separated) from modifying the at least one second data element comprised in the third set of data indices within the second tertiary data store. It is further appreciated that the first modified data element and the second modified data element are separable based on temporal data associated with the first modified data element and the second modified data element. According to one embodiment, a first user may transmit a first query, using the first application and/or second application, which modifies the at least one first data element while a second user may transmit a second query, using the first application and/or the second application, which modifies the at least second data element referenced above. A third user may transmit third query, using the first application and/or the second application that directly accesses data indices in the primary data store without affecting, and/or interacting, with the at least first data element or the at least second data element. In particular, the first query, the second query, and the third query may be synchronously (e.g., at the same time) or asynchronously (e.g., at different times) executed as the case may require. As a result of this, a plurality of users can submit queries to the secure storage network that are independently executed using at least a secondary and/or a tertiary data store thereby speeding or accelerating query execution as well as preventing dirty data read scenarios (e.g., accessing data being modified by, for example, a first query).

In one embodiment, the temporal data referenced above comprises data indicating one or more of: a time, duration, or period within which the at least first data element or the at least second data element is modified; a frequency with which the first data element or the second data element is modified; and a degree to which the at least first data element or second data element is modified.

At block 1214, the one or more data engines execute, based on the temporal data, a first prioritization computing operation, to select one of the first modified data element and the second modified data element. In one embodiment, the first prioritization computing operation comprises a ranking and/or classifying, and/or ordering, and/or rating, and/or sorting the first modified data element and the second modified data element to drive data maintenance (e.g., data update, data deletion, and creation) computing operations associated with the secure storage network.

At block 1216, the one or more data engines initiate, based on the first prioritization computing operation, a first data deduplication computing operation by selectively marking (e.g., identifying and/or classifying and/or designating) data elements within the first secondary data store that map to the one of the first modified data element and the second modified data element. In one embodiment, the data deduplication computing operation comprises a computing process that eliminates excessive copies of data elements within the secure storage network and significantly decreases storage capacity requirements of the secure storage network and eliminate dirty data read scenarios.

At block 1218, the one or more data engines merge, based on the selectively marking, the one of the first modified data element and the second modified data element with data elements comprised in the first secondary data store. This data merger can comprise: combining the first and second modified data elements with data elements of the secondary data store; updating one or more data elements in the secondary data store based on the first and second modified data elements; deleting one or more data elements of the secondary data store based on the first and second modified data elements; and creating new data elements within the secondary data store based on, or without considering, the first and second modified data elements.

In another embodiment, a system and a computer program product can include or execute the method described above. These and other implementations may each optionally include one or more of the following features.

According to one embodiment, the above method comprises receiving, prior to executing the first prioritization computing operation, a first computing command associated with the first modified data element or the second modified data element, such that the first computing command comprises a query configured to implement one or more of: a first data update computing operation based on the first modified data element or the second modified element within the first secondary data store of the plurality of secondary data stores; or a first data deletion computing operation sociated with first modified data element or the second modified element within the first secondary data store of the plurality of secondary data stores. According to some embodiments, the first computing command is associated with at least one of: creating a first data record for storage in the object database based on the index data; reading a second data record stored in the object database based on the index data; updating a third data record stored in the object database based on the index data; and searching a plurality of records stored in the object database based on the index data. According to one embodiment, the first data update computing operation is a computing operation that modifies and/or transforms and/or configures and/or transitions one or more data elements from a first state to a second state.

It is appreciated that the secure storage network is configured to receive a plurality of input query commands, such that the plurality of primary data stores, the plurality of secondary data stores, and the plurality of tertiary data stores enable at least one of: separating execution of the plurality of input query commands and thereby speed execution of each of the plurality of input query commands; synchronously (e.g., at the same time) or asynchronously (e.g., at different times) executing the plurality of input query commands and thereby generating a plurality of temporal data; detecting and eliminating duplicated (e.g., multiple copies of the same data indices) index data within one or more of the plurality of primary data stores, the plurality of secondary data stores, and the plurality of tertiary data stores based on the temporal data; and preventing dirty read computing operations based on the plurality of input query commands. In some cases, the dirty read computing operations involve executing a first computing operation on data elements that are still being operated on by a second computing operation or a third computing operation thereby leading to data element version control issues.

It is further appreciated that the first application is configured to adaptively (e.g., automatically and/or changeably and/or dynamically) impose (e.g., place and/or enforce) a customizable data structure on one or more data objects within the object database; and the second application is configured to instantiate data indices or an inverted data index corresponding to one or more data objects within the object database. As such the first application enables one or more digital accounts associated with the secure storage network to customize or otherwise adapt the data structure or a data template of one or more data objects within the object database based on: data objectives associated with the one or more digital accounts; data types associated with the one or more data objects within the object database relative to the one or more digital accounts; data templates or data structures of data objects within the object database relative to the one or more user accounts; and data queries associated with the one or more digital accounts. Furthermore, the second application is configured to enable querying the object database as an inverted storage index. It is appreciated that the inverted data index referenced herein can comprise a data index storing data elements that indicate where search items (e.g., search terms, data objects, files, data links, etc.) are located within the object database.

In some cases, the first application is configured to generate a first log file for determining or tracking computing operations occurring in one or more of the first tertiary data store or the second tertiary data store. In addition, the secure storage network can adaptively (e.g., automatically or as needed based on current computations) generate a second log file for detecting or recording data events or data interactions among the first application, the second application, and the object database. Moreover, the first log file and the second log file can be applied by the secure storage system, to maintain data consistency within at least the object database of the secure storage network.

According to one embodiment, the plurality of primary data stores and the plurality of secondary data stores and the plurality of tertiary data stores comprise an inverted storage index associated with a record or a file, such that search terms associated with a computing input (e.g., computing command) to the secure storage network is mapped to the record or the file using at least one of the plurality of primary data stores or the plurality of secondary data stores.

In some embodiments, the merging referenced above comprises: searching the first secondary data store generate search data; generating, based on the search data, identifier data comprising a document identifier list associated with the selectively marking; deleting, during a data maintenance computing stage of the first secondary data store, data elements within the first secondary data store that correspond to one of the first modified data element and the second modified data element; and in response to the deleting, one of the first modified data element and the second modified data element with data elements comprised in the first secondary data store.

According to some embodiments, a management computing sub-system associated with the secure storage network coordinates data operations among the plurality of primary data stores, the plurality of secondary data stores, and the plurality of tertiary data stores.

The above method further includes receiving a second input command comprising a search parameter associated with a file or record stored within the object database. In response to executing the second input command based on one or more of the plurality of primary data stores, the plurality of secondary data stores, and the plurality of tertiary data stores, initiating generation of a visualization on a graphical display that indicates the file or the record or an updated file or an updated record.

In exemplary implementations, data comprised in one or more of the plurality of primary data stores, the plurality of secondary data stores, or the plurality of tertiary data stores indicate, or is associated with, a denormalized copy of data objects stored in the object database.

It is appreciated that a document or a file comprised in the object database is represented within the secure storage network as data record elements spread across two or more data storage structures (e.g., data tables). It is further appreciated that the denormalized copy of data objects indicate a consolidation of data record elements spread across the two or more data storage structures.

In one embodiment, the first tertiary data store or the second tertiary data store has a third size that is smaller than the second size of the plurality of secondary data stores.

In some instances, the above method further includes: determining a plurality of temporal data for the plurality of secondary data stores; executing, based on the plurality of temporal data, a second prioritization computing operation (e.g., similar to the first prioritization computing operation) to select a plurality of modified data elements associated with the plurality of secondary data stores; initiating, based on the second prioritization computing operation, a second data deduplication computing operation (e.g., similar to the first deduplication computing operation) by selectively marking data elements within the plurality of primary data stores that map to the plurality of modified data elements associated with the plurality of secondary data stores; and merging, based on selectively marking the data elements within the plurality of primary data stores, the plurality of modified data elements with data elements comprised in the plurality of primary data stores.

It is appreciated that the plurality of primary data stores comprise a plurality of data shards optimized (e.g., efficiently configured) for storing index data associated with data objects within the object database of the secure storage network. It is further appreciated that the secure storage network is comprised in a cloud computing system configured to receive text-based queries that are processed using at least one of the first application or the second application.

It is appreciated that the first computing operation discussed in conjunction with determining the second data store is associated with a query configured to execute one or more of: search for a first file or a first record associated with the first storage structure or the second storage structure; modify or update a second file or a second record associated with at least the first storage structure; and create index data associated with a new file or a new record for storage in one of the first storage structure or the second storage structure.

It is further appreciated that data indices or data elements in one or more secondary data stores (e.g., active index data) may be also merged with data elements of one or more primary data stores (e.g., stable index data) during the data maintenance stage referenced above.

Second Additional Exemplary Workflow

FIG. 13 illustrates a second exemplary workflow for controlling and speeding up data access in a secure storage network. It is appreciated that a data engine stored in a memory device (e.g., memory unit 204 of FIGS. 2 and 3) may cause a computer processor to execute the various processing stages of FIG. 13. It is further appreciated that the various processing stages of FIG. 13 may be executed in a different order from those shown while some stages may be optional.

At block 1302, the data engine communicatively couples an object database, a first application, and a second application to form the disclosed secure storage network.

At block 1304, the data engine activates, based on the communicatively coupling, a plurality of primary data stores (e.g., stable index data stores) thereby resulting in an activated plurality of primary data stores. In one embodiment, the plurality of primary data stores are configured to store first index data corresponding to a plurality of data objects stored in the object database referenced above, such that at least one data store of the plurality of primary data stores has a first size.

Turning to block 1306, the data engine activates, based on the activated plurality of primary data stores: a plurality of secondary data stores (e.g., active index data stores) that correspond to, and are separate from, the plurality of primary data stores, such that at least one secondary data store of the plurality of secondary data stores has a second size that is smaller than the first size and is configured to store second index data; and a plurality of tertiary data stores (e.g., user index data stores) that correspond to, and are separate from, the plurality of secondary data stores.

At block 1308, the data engine selects, using the one or more computing device processors: a first primary data store of the plurality of primary data stores; a first secondary data store of the plurality of secondary data stores; a first tertiary data store of the plurality of tertiary data stores; and a second tertiary data store of the plurality of tertiary data stores.

At block 1310, the data engine creates a first set of data indices in the first tertiary data store. It is appreciated that the first set of data indices comprise new data indices corresponding to new data objects that are: newly stored in the object database; or that are being conditioned for storage in the object database. It is further appreciated that the first set of data indices is different from a second set of data indices in the first secondary data store that correspond to existing data objects previously stored in the object database. According to one embodiment, creating of the first set of data indices in the first tertiary data store is computationally isolated from creating or modifying a third set of data indices within the second tertiary data store. Furthermore, data changes within the first tertiary data store are separable from data changes within the second tertiary data store based on temporal data of computing operations executed within the secure storage network.

Turning back to FIG. 13, the data engine executes, based on the temporal data, a prioritization computing operation, to select one of the first set of data indices and the third set of data indices as indicated at block 1312.

At block 1314, the data engine initiates, based on the prioritization computing operation, a data update or a data write computing operation within the first primary data store by merging the second set of data indices within the first secondary data store with one of: the first set of data indices; and the third set of data indices.

In another embodiment, a system and/or a computer program product can include or execute the method described above. These and other implementations may each optionally include one or more of the following features.

The data engine may receive, prior to executing the prioritization computing operation, a first computing command associated with the first set of data indices. In one embodiment, the first computing command comprises a query configured to implement one or more of: a data creation computing operation associated with the first set of data indices; a data update computing operation associated with the third set of data indices; or a data deletion computing operation associated with the third set of data indices.

According to one embodiment, the first computing command is associated with at least one of: creating a first data record for storage in the object database based on the first set of data indices; reading a second data record stored in the object database based on the first set of data indices or the second set of data indices; updating a third data record stored in the object database based on the first set of data indices or the second set of data indices; or searching a plurality of data records (e.g., documents, files, data objects, etc.) stored in the object database based on the first set of data indices or the third set of data indices.

In other embodiments, the secure storage network is configured to receive a plurality of input query commands, such that the plurality of primary data stores, the plurality of secondary data stores, and the plurality of tertiary data stores enable at least one of: separating execution of the plurality of input query commands and thereby speed execution of each of the plurality of input query commands; synchronously or asynchronously executing the plurality of input query commands and thereby generate a plurality of temporal data; detecting and eliminating duplicated index data within one or more of the plurality of primary data stores, the plurality of secondary data stores, and the plurality of tertiary data stores based on the temporal data; and preventing dirty read computing operations based on the plurality of input query commands.

In one embodiment, the first application is configured to adaptively impose a customizable data structure on one or more data objects within the object database. In addition, the second application can be configured to instantiate an inverted data index corresponding to the one or more data objects within the object database.

In cases, the second application is configured to enable querying the object database as an inverted storage index.

According to one embodiment, at least one of: the first application is configured to generate a first log file for determining or tracking computing operations occurring in one or more of the first tertiary data store or the second tertiary data store; the secure storage network adaptively generates a second log file for detecting or recording data events or data interactions among the first application, the second application, and the object database; and the first log file and the second log file are applied by the secure storage system, to maintain data consistency (e.g., data accuracy, data congruency, data integrity) within at least the object database of the secure storage network.

In some cases, at least one of the plurality of primary data stores and the plurality of secondary data stores and the plurality of tertiary data stores comprises an inverted storage index associated with a record or a file or a document or a data object, such that search terms associated with a computing input to the secure storage network is mapped to the record or the file or the document or the data object using at least one of the plurality of primary data stores or the plurality of secondary data stores.

According to one embodiment, a management computing sub-system associated with the secure storage network coordinates data operations among the plurality of primary data stores, the plurality of secondary data stores, and the plurality of tertiary data stores.

In addition, the data engine of FIG. 13 can receive a second input command comprising a search parameter associated with a file or record or a document or a data object stored within the object database; and in response to executing the second input command based on one or more of the plurality of primary data stores, the plurality of secondary data stores, and the plurality of tertiary data stores, the data engine may initiate generation of a visualization on a graphical display (e.g. a graphical display device) that indicates the file or the record or document or data object or an updated file or an updated record or an updated document or an updated data object.

In some embodiments, data comprised in one or more of the plurality of primary data stores, the plurality of secondary data stores, or the plurality of tertiary data stores indicates, or is associated with, a denormalized copy of data objects or files or documents or data records stored in the object database.

Furthermore, a document or a file or record or data object comprised or stored in the object database can be represented within the secure storage network as data record elements spread across two or more data storage structures including data tables. In addition, the denormalized copy of the data objects indicate a consolidation of data record elements spread across the two or more data storage structures.

According to one embodiment, the first tertiary data store or the second tertiary data store has a third size that is smaller than the second size associated with the plurality of secondary data stores.

It is further appreciated that data indices or data elements in one or more secondary data stores (e.g., active index data) may be also merged with data elements of one or more primary data stores (e.g., stable index data) during the data maintenance stage referenced above.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a sub-system, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-systems, sub programs, or portions of code). A computer program can be deployed to be executed on one computer or on multiple computers that are located at one site or distributed across multiple sites and interconnected by a communication network.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

It is appreciated that the term optimize/optimal and its variants (e.g., efficient or optimally) may simply indicate improving, rather than the ultimate form of 'perfection' or the like.

It is further appreciated that any portion or element of any embodiment (structure, method, etc.) disclosed herein may be combined with any portion or element of any other embodiment (structure, method, etc.) disclosed herein.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Brief Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, which are protected thereby. In all instances, the scope of such claims shall be considered on their own merits in light of this disclosure, but should not be constrained by the headings set forth herein.

The invention claimed is:

1. A method for controlling and speeding up data access in a secure storage network, the method comprising:

communicatively coupling, using one or more computing device processors, an object database, a first application, and a second application to form the secure storage network;

activating, using the one or more computing device processors and based on the communicatively coupling, a plurality of primary data stores that are configured to store first index data corresponding to a plurality of data objects stored in the object database, such that at least one first data store of the plurality of primary data stores has a first size, thereby generating an activated plurality of primary data stores;

activating, using the one or more computing device processors and based on the activated plurality of primary data stores:

a plurality of secondary data stores that correspond to, and are separate from, the plurality of primary data stores, such that at least one second data store of the plurality of secondary data stores has a second size that is smaller than the first size and is configured to store second index data, and a plurality of tertiary data stores that correspond to, and are separate from, the plurality of secondary data stores;

selecting, using the one or more computing device processors:

a first primary data store of the plurality of primary data stores, a first secondary data store of the plurality of secondary data stores, a first tertiary data store of the plurality of tertiary data stores, and a second tertiary data store of the plurality of tertiary data stores;
loading, using the one or more computing device processors:
a first set of data indices into the first primary data store,
a second set of data indices corresponding to the first set of data indices into the first secondary data store,
a third set of data indices corresponding to the second set of data indices into the first tertiary data store, and
the third set of data indices corresponding to the second set of data indices into the second tertiary data store;
modifying, using the one or more computing device processors and based on the first application or the second application:
at least one first data element comprised in the third set of data indices within the first tertiary data store to generate a first modified data element, and
at least one second data element comprised in the third set of data indices within the second tertiary data store to generate a second modified data element, wherein:
the modifying the at least one first data element comprised in the third set of data indices within the first tertiary data store is computationally isolated from the modifying the at least one second data element comprised in the third set of data indices within the second tertiary data store,
the first modified data element and the second modified data element are separable based on temporal data associated with the first modified data element and the second modified data element;
executing, using the one or more computing device processors and based on the temporal data, a first prioritization computing operation, to select one of the first modified data element and the second modified data element;
initiating, using the one or more computing device processors and based on the first prioritization computing operation, a first data deduplication computing operation by selectively marking first data elements within the first secondary data store that map to the one of the first modified data element and the second modified data element;
merging, using the one or more computing device processors and based on the selectively marking, the one of the first modified data element and the second modified data element with the first data elements comprised in the first secondary data store, the merging comprising:
searching the first secondary data store generate search data,
generating, based on the search data, identifier data comprising a document identifier list associated with the selectively marking,
deleting, during a data maintenance computing stage of the first secondary data store, second data elements within the first secondary data store that correspond to one of the first modified data element and the second modified data element, and
in response to the deleting, merging one of the first modified data element and the second modified data element with the second data elements comprised in the first secondary data store;
determining, using the one or more computing device processors, a plurality of temporal data for the plurality of secondary data stores;

executing, using the one or more computing device processors and based on the plurality of temporal data, a second prioritization computing operation to select a plurality of modified data elements associated with the plurality of secondary data stores;
initiating, using the one or more computing device processors and based on the second prioritization computing operation, a second data deduplication computing operation by selectively marking third data elements within the plurality of primary data stores that map to the plurality of modified data elements associated with the plurality of secondary data stores; and
merging, using the one or more computing device processors and based on selectively marking the third data elements within the plurality of primary data stores, the plurality of modified data elements with the third data elements comprised in the plurality of primary data stores,
wherein the first application adaptively imposes a customizable data structure on one or more first data objects within the object database,
wherein the second application instantiates an inverted data index corresponding to one or more second data objects within the object database.

2. The method of claim 1, further comprising, receiving, prior to the executing the first prioritization computing operation, a first computing command associated with the first modified data element or the second modified data element, the first computing command comprising a query implementing one or more of:
a first data update computing operation based on the first modified data element or the second modified data element within the first secondary data store of the plurality of secondary data stores, or
a first data deletion computing operation associated with the first modified data element or the second modified data element within the first secondary data store of the plurality of secondary data stores.

3. The method of claim 2, wherein the first computing command is associated with at least one of:
creating a first data record for storage in the object database based on the second index data,
reading a second data record stored in the object database based on the second index data,
updating a third data record stored in the object database based on the second index data, or
searching a plurality of records stored in the object database based on the second index data.

4. The method of claim 1, wherein the secure storage network receives a plurality of input query commands, such that the plurality of primary data stores, the plurality of secondary data stores, and the plurality of tertiary data stores enable at least one of:
separating execution of the plurality of input query commands and thereby speed execution of each of the plurality of input query commands,
synchronously or asynchronously executing the plurality of input query commands and thereby determining the plurality of temporal data,
detecting and eliminating duplicated index data within one or more of the plurality of primary data stores, the plurality of secondary data stores, and the plurality of tertiary data stores based on the temporal data, and
preventing dirty read computing operations based on the plurality of input query commands.

5. The method of claim 1, wherein the second application enables querying the object database as an inverted storage index.

6. The method of claim 1, wherein at least one of:
the first application generates a first log file for determining or tracking computing operations occurring in one or more of the first tertiary data store or the second tertiary data store,
the secure storage network adaptively generates a second log file for detecting or recording data events or data interactions among the first application, the second application, and the object database, and
the first log file and the second log file are applied by the secure storage system, to maintain data consistency within at least the object database of the secure storage network.

7. The method of claim 1, wherein at least one of the plurality of primary data stores and the plurality of secondary data stores and the plurality of tertiary data stores comprises an inverted storage index associated with a record or a file, such that search terms associated with a computing input to the secure storage network is mapped to the record or the file using at least one of the plurality of primary data stores or the plurality of secondary data stores.

8. The method of claim 1, wherein a management computing sub-system associated with the secure storage network coordinates data operations among the plurality of primary data stores, the plurality of secondary data stores, and the plurality of tertiary data stores.

9. The method of claim 1, further comprising:
receiving a second input command comprising a search parameter associated with a file or record stored within the object database; and
in response to executing the second input command based on one or more of the plurality of primary data stores, the plurality of secondary data stores, and the plurality of tertiary data stores, initiating generation of a visualization on a graphical display that indicates the file or the record or an updated file or an updated record.

10. The method of claim 1, wherein data comprised in one or more of the plurality of primary data stores, the plurality of secondary data stores, or the plurality of tertiary data stores indicates, or is associated with, a denormalized copy of data objects stored in the object database.

11. The method of claim 10, wherein:
a document or a file comprised in the object database is represented within the secure storage network as data record elements spread across two or more data storage structures including data tables, and
the denormalized copy of data objects indicate a consolidation of data record elements spread across the two or more data storage structures.

12. The method of claim 1, wherein the first tertiary data store or the second tertiary data store has a third size that is smaller than the second size of the plurality of secondary data stores.

13. The method of claim 1, wherein the plurality of primary data stores comprise a plurality of data shards optimized for storing third index data associated with data objects within the object database of the secure storage network.

14. The method of claim 1, wherein the secure storage network is comprised in a cloud computing system that receives text-based queries that are processed using at least one of the first application or the second application.

15. A system for controlling and speeding up data access in a secure storage network, the system comprising:
one or more computing system processors; and
at least one memory storing instructions, that when executed by the one or more computing system processors causes the one or more computing system processors to:
communicatively couple an object database, a first application, and a second application to form the secure storage network;
activate, based on the communicatively coupling, a plurality of primary data stores that are configured to store first index data corresponding to a plurality of data objects stored in the object database, such that at least one first data store of the plurality of primary data stores has a first size, thereby generating an activated plurality of primary data stores;
activate, based on the activated plurality of primary data stores:
a plurality of secondary data stores that correspond to, and are separate from, the plurality of primary data stores, such that at least one second data store of the plurality of secondary data stores has a second size that is smaller than the first size and is configured to store second index data, and
a plurality of tertiary data stores that correspond to, and are separate from, the plurality of secondary data stores;
select:
a first primary data store of the plurality of primary data stores,
a first secondary data store of the plurality of secondary data stores,
a first tertiary data store of the plurality of tertiary data stores, and
a second tertiary data store of the plurality of tertiary data stores;
load:
a first set of data indices into the first primary data store,
a second set of data indices corresponding to the first set of data indices into the first secondary data store,
a third set of data indices corresponding to the second set of data indices into the first tertiary data store, and
the third set of data indices corresponding to the second set of data indices into the second tertiary data store;
modify, based on the first application or the second application:
at least one first data element comprised in the third set of data indices within the first tertiary data store to generate a first modified data element, and
at least one second data element comprised in the third set of data indices within the second tertiary data store to generate a second modified data element, wherein:
the modifying the at least one first data element comprised in the third set of data indices within the first tertiary data store is computationally isolated from the modifying the at least one second data element comprised in the third set of data indices within the second tertiary data store,
the first modified data element and the second modified data element are separable based on temporal data associated with the first modified data element and the second modified data element;
execute, based on the temporal data, a prioritization computing operation, to select one of the first modified data element and the second modified data element;
initiate, based on the prioritization computing operation, a data deduplication computing operation by selectively marking first data elements within the first secondary data store that map to the one of the first modified data element and the second modified data element; and
merge, based on the selectively marking, the one of the first modified data element and the second modified data element with the first data elements comprised in the first secondary data store, the merge comprising:
searching the first secondary data store generate search data,
generating, based on the search data, identifier data comprising a document identifier list associated with the selectively marking,
deleting, during a data maintenance computing stage of the first secondary data store, second data elements within the first secondary data store that correspond to one of the first modified data element and the second modified data element, and
in response to the deleting, merging one of the first modified data element and the second modified data element with the second data elements comprised in the first secondary data store;
determine a plurality of temporal data for the plurality of secondary data stores;
execute, based on the plurality of temporal data, a second prioritization computing operation to select a plurality of modified data elements associated with the plurality of secondary data stores;
initiate, based on the second prioritization computing operation, a second data deduplication computing operation by selectively marking third data elements within the plurality of primary data stores that map to the plurality of modified data elements associated with the plurality of secondary data stores; and
merge, based on selectively marking the third data elements within the plurality of primary data stores, the plurality of modified data elements with the third data elements comprised in the plurality of primary data stores,
wherein the first application adaptively imposes a customizable data structure on one or more first data objects within the object database,
wherein the second application instantiates an inverted data index corresponding to one or more second data objects within the object database.

16. The system of claim 15, wherein the secure storage network receives a plurality of input query commands, such that the plurality of primary data stores, the plurality of secondary data stores, and the plurality of tertiary data stores enable at least one of:
separating execution of the plurality of input query commands and thereby speed execution of each of the plurality of input query commands,
synchronously or asynchronously executing the plurality of input query commands and thereby determining the plurality of temporal data,
detecting and eliminating duplicated index data within one or more of the plurality of primary data stores, the plurality of secondary data stores, and the plurality of tertiary data stores based on the temporal data, and
preventing dirty read computing operations based on the plurality of input query commands.

17. The system of claim 15, wherein:
the second application instantiates data indices corresponding to one or more third data objects within the object database.

* * * * *